(12) United States Patent
Johnson et al.

(10) Patent No.: US 11,733,699 B2
(45) Date of Patent: Aug. 22, 2023

(54) ULTRASONIC PERIMETER RANGING SENSOR SYSTEMS AND METHODS

(71) Applicant: FLIR Belgium BVBA, Meer (BE)

(72) Inventors: Mark Johnson, Vannes (FR); Neil Millerchip, Fareham (GB); Kajetan Dworski, Fareham (GB); Paul Stokes, Fleet (GB)

(73) Assignee: FLIR Belgium BVBA, Meer (BE)

( * ) Notice: Subject to any disclaimer, the term of this patent is extended or adjusted under 35 U.S.C. 154(b) by 303 days.

(21) Appl. No.: 17/012,035

(22) Filed: Sep. 3, 2020

(65) Prior Publication Data

US 2020/0401143 A1    Dec. 24, 2020

Related U.S. Application Data

(63) Continuation-in-part of application No. PCT/US2018/058958, filed on Oct. 30, 2019, and a
(Continued)

(51) Int. Cl.
*G05D 1/02*     (2020.01)
*G01C 21/20*    (2006.01)
(Continued)

(52) U.S. Cl.
CPC .......... *G05D 1/0206* (2013.01); *B63B 43/18* (2013.01); *B63H 25/42* (2013.01); *G01C 21/203* (2013.01);
(Continued)

(58) Field of Classification Search
CPC ...... G05D 1/0206; B63B 43/18; B63H 25/42; B63H 2025/026; G01C 21/203; G01C 21/3804; G01S 13/862
See application file for complete search history.

(56) References Cited

U.S. PATENT DOCUMENTS 6,002,644 A *  12/1999  Wilk ................. G01S 15/89
                                                367/87
9,927,520 B1 *  3/2018  Ward ................. G01S 15/93
(Continued)

FOREIGN PATENT DOCUMENTS

EP       1873052         1/2008
EP       2607919 A1 *    6/2013  .......... G01S 15/931
(Continued)

*Primary Examiner* — Dale W Hilgendorf
(74) *Attorney, Agent, or Firm* — Haynes and Boone, LLP

(57) ABSTRACT

Techniques are disclosed for systems and methods to provide perimeter ranging for navigation of mobile structures. A navigation control system includes a logic device, a perimeter ranging system, one or more actuators/controllers, and modules to interface with users, sensors, actuators, and/or other elements of a mobile structure. The logic device is configured to receive perimeter sensor data from ultrasonic perimeter ranging sensor assemblies of the perimeter ranging system and generate an obstruction map based on the received perimeter sensor data. The logic device determines a range to and/or a relative velocity of a navigation hazard based on the received perimeter sensor data. The logic device determines navigation control signals based on the range and/or relative velocity of the navigation hazard. Control signals may be displayed to a user and/or used to adjust a steering actuator, a propulsion system thrust, and/or other operational systems of the mobile structure.

20 Claims, 16 Drawing Sheets

Related U.S. Application Data continuation-in-part of application No. 16/533,598, filed on Aug. 6, 2019, now Pat. No. 11,505,292, which is a continuation of application No. PCT/US2018/037954, filed on Jun. 15, 2018.

(60) Provisional application No. 62/897,104, filed on Sep. 6, 2019, provisional application No. 62/851,025, filed on May 21, 2019, provisional application No. 62/753,763, filed on Oct. 31, 2018, provisional application No. 62/628,905, filed on Feb. 9, 2018, provisional application No. 62/584,718, filed on Nov. 10, 2017, provisional application No. 62/521,346, filed on Jun. 16, 2017.

(51) Int. Cl.
  G01S 13/86 (2006.01)
  B63H 25/42 (2006.01)
  G01C 21/00 (2006.01)
  B63B 43/18 (2006.01)
  B63H 25/02 (2006.01)

(52) U.S. Cl.
  CPC ........ G01C 21/3804 (2020.08); G01S 13/862 (2013.01); *B63H 2025/026* (2013.01)

(56) References Cited

U.S. PATENT DOCUMENTS

| | | | |
|---|---|---|---|
| 10,852,428 B2* | 12/2020 | Stokes | G01S 15/96 |
| 2003/0137443 A1 | 7/2003 | Van Rees et al. | |
| 2004/0155759 A1* | 8/2004 | Gunderson | G01S 13/862 |
| | | | 340/435 |
| 2005/0075016 A1* | 4/2005 | Bertetti | B63H 25/42 |
| | | | 440/84 |
| 2005/0109254 A1* | 5/2005 | Luong | B63C 11/48 |
| | | | 114/66 |
| 2005/0237226 A1 | 10/2005 | Judge et al. | |
| 2005/0275514 A1* | 12/2005 | Roberts | B60Q 5/00 |
| | | | 340/436 |
| 2007/0089660 A1* | 4/2007 | Bradley | B63H 21/22 |
| | | | 114/144 A |
| 2010/0092042 A1* | 4/2010 | Asari | B60R 1/00 |
| | | | 382/106 |
| 2010/0094491 A1 | 4/2010 | Oehlgrien et al. | |
| 2010/0138083 A1 | 6/2010 | Kaji | |
| 2012/0087210 A1* | 4/2012 | Kasano | G01S 15/586 |
| | | | 367/90 |
| 2012/0129410 A1* | 5/2012 | Tyers | B63H 21/21 |
| | | | 440/1 |
| 2013/0297104 A1* | 11/2013 | Tyers | B63H 21/21 |
| | | | 701/301 |
| 2014/0122018 A1* | 5/2014 | Sundholm | B66B 3/006 |
| | | | 187/388 |
| 2015/0089427 A1* | 3/2015 | Akuzawa | G05D 1/0206 |
| | | | 715/771 |
| 2015/0097704 A1* | 4/2015 | Kwon | G01S 7/4808 |
| | | | 340/932.2 |
| 2016/0114798 A1* | 4/2016 | Kim | G08G 1/166 |
| | | | 701/41 |
| 2016/0187883 A1 | 6/2016 | Tyers et al. | |
| 2016/0214534 A1 | 7/2016 | Richards et al. | |
| 2018/0004209 A1* | 1/2018 | Akuzawa | G05D 1/0206 |
| 2018/0015994 A1* | 1/2018 | Kishimoto | B63H 25/46 |
| 2019/0359300 A1* | 11/2019 | Johnson | G01S 13/937 |
| 2019/0361457 A1* | 11/2019 | Johnson | G05D 1/0044 |
| 2020/0174096 A1* | 6/2020 | Cho | G01S 13/343 |
| 2020/0193840 A1* | 6/2020 | Derginer | G05D 1/0206 |
| 2020/0202719 A1* | 6/2020 | Derginer | B63H 25/42 |
| 2020/0247518 A1* | 8/2020 | Dannenberg | G08G 3/02 |
| 2020/0250992 A1* | 8/2020 | Derginer | B63H 25/04 |
| 2021/0094659 A1* | 4/2021 | Akuzawa | B63B 79/15 |
| 2021/0261226 A1* | 8/2021 | Johnson | B63B 79/15 |
| 2021/0269128 A1* | 9/2021 | Rivers | B63B 79/40 |
| 2022/0214171 A1* | 7/2022 | Johnson | B60L 58/12 |

FOREIGN PATENT DOCUMENTS

| | | | | |
|---|---|---|---|---|
| EP | 2730946 A1 * | 5/2014 | ......... | G01S 17/023 |
| JP | 2010057187 A * | 3/2010 | ......... | G01S 15/931 |
| JP | 2017/052297 | 3/2017 | | |
| WO | WO-2014016487 A2 * | 1/2014 | ......... | B60Q 9/008 |
| WO | WO 2015/184996 | 12/2015 | | |
| WO | WO 2017/136014 | 8/2017 | | |
| WO | WO2018/069405 A1 | 4/2018 | | |
| WO | WO2018/100749 A1 | 6/2018 | | |
| WO | WO 2018/102772 | 6/2018 | | |

* cited by examiner 100E-1

100E-2

ULTRASONIC PERIMETER RANGING SENSOR SYSTEMS AND METHODS

CROSS-REFERENCE TO RELATED APPLICATIONS

This application claims priority to and the benefit of U.S. Provisional Patent Application No. 62/897,104 filed Sep. 6, 2019 and entitled "ULTRASONIC PERIMETER RANGING SENSOR SYSTEMS AND METHODS," which is hereby incorporated by reference in its entirety.

This application is a continuation-in-part of U.S. patent application Ser. No. 16/533,598 (now U.S. Pat. No. 11,505, 292) filed Aug. 6, 2019 and entitled "PERIMETER RANGING SENSOR SYSTEMS AND METHODS, which is hereby incorporated by reference in its entirety. Patent application Ser. No. 16/533,598 filed Aug. 6, 2019 is a continuation of International Patent Application No. PCT/US2018/037954 filed Jun. 15, 2018 and entitled "PERIMETER RANGING SENSOR SYSTEMS AND METHODS," which is hereby incorporated by reference in its entirety.

International Patent Application No. PCT/US2018/037954 filed Jun. 15, 2018 claims priority to and the benefit of U.S. Provisional Patent Application No. 62/628,905 filed Feb. 9, 2018 and entitled "AUTONOMOUS AND ASSISTED DOCKING SYSTEMS AND METHODS," which is hereby incorporated by reference in its entirety.

International Patent Application No. PCT/US2018/037954 filed Jun. 15, 2018 claims priority to and the benefit of U.S. Provisional Patent Application No. 62/584,718 filed Nov. 10, 2017 and entitled "AUTONOMOUS AND ASSISTED DOCKING SYSTEMS AND METHODS," which is hereby incorporated by reference in its entirety.

International Patent Application No. PCT/US2018/037954 filed Jun. 15, 2018 also claims priority to and the benefit of U.S. Provisional Patent Application No. 62/521,346 filed Jun. 16, 2017 and entitled "AUTONOMOUS AND ASSISTED DOCKING SYSTEMS AND METHODS," which is hereby incorporated by reference in its entirety.

This application is a continuation-in-part of International Patent Application No. PCT/US2019/058958 filed Oct. 30, 2019 and entitled "ASSISTED DOCKING GRAPHIC USER INTERFACE SYSTEMS AND METHODS," which is hereby incorporated by reference in its entirety. International Patent Application No. PCT/US2019/058958 filed Oct. 30, 2019 claims priority to and the benefit of U.S. Provisional Patent Application No. 62/851,025 filed May 21, 2019 and entitled "ASSISTED DOCKING GRAPHIC USER INTERFACE SYSTEMS AND METHODS" and U.S. Provisional Patent Application No. 62/753,763 filed Oct. 31, 2018 and entitled "ASSISTED DOCKING GRAPHICAL USER INTERFACE SYSTEMS AND METHODS," which are hereby incorporated by reference in their entirety.

TECHNICAL FIELD

One or more embodiments of the invention relate generally to ranging sensor systems and more particularly, for example, to systems and methods for perimeter ranging for use with assisted and/or fully autonomous navigation and docking for watercraft.

BACKGROUND

Directional control systems are used to provide automated and/or supplemented control for planes, watercraft, and, more recently, automobiles. Conventional automated directional control systems typically require a multitude of relatively expensive and purpose-built sensors that are difficult to retrofit into an existing vehicle and produce results that are not accurate enough to be used to provide reliable docking or parking assist for a vehicle, particularly in crowded conditions and/or while navigational control is complicated by external disturbances, such as by wind or water currents. Thus, there is a need for improved docking assist methodologies.

SUMMARY

Techniques are disclosed for systems and methods to provide perimeter ranging for navigation of mobile structures. In accordance with one or more embodiments, a navigation control system may include a logic device, a perimeter ranging system, one or more actuators/controllers, and modules to interface with users, sensors, actuators, and/or other elements of a mobile structure. The logic device may be configured to receive perimeter sensor data from the perimeter ranging system. The logic device may determine a range to and/or a relative velocity of a navigation hazard disposed within a monitoring perimeter of the perimeter ranging system based on the received perimeter sensor data. The logic device may then generate a display view of the perimeter sensor data or determine navigation control signals based on the range and/or relative velocity of the navigation hazard. These and other control signals may be displayed to a user and/or used to adjust a steering actuator, a propulsion system thrust, and/or other operational systems of the mobile structure.

In various embodiments, a perimeter ranging system may include an ultrasonic perimeter ranging sensor assembly configured to be coupled to a mobile structure and a logic device configured to communicate with the ultrasonic perimeter ranging sensor assembly. The logic device may be configured to receive perimeter sensor data from the perimeter ranging sensor assembly and to generate an obstruction map based, at least in part, on the perimeter sensor data received from the ultrasonic perimeter ranging sensor assembly.

In some embodiments, a method to provide perimeter ranging for a mobile structure may include receiving perimeter sensor data from each of one or more ultrasonic perimeter ranging sensor assemblies of a perimeter ranging system coupled to a mobile structure and generating an obstruction map based, at least in part, on the perimeter sensor data received from each of the one or more ultrasonic perimeter ranging sensor assemblies.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, perimeter ranging systems may be used in conjunction with docking assist systems and methods to provide assisted and/or fully automated docking and/or directional control for mobile structures that is substantially more reliable and accurate than conventional systems across a wide variety of types of structures and environmental conditions. Embodiments disclosed herein address deficiencies of conventional methodologies with respect to selection of target docking position and orientation and/or target docking track, perimeter monitoring, navigation hazard avoidance, user control of docking approach, and adaptive navigational control of a mobile structure during assisted and/or autonomous docking.

One or more embodiments of the described docking assist system may advantageously include a controller and one or more of an orientation sensor, a gyroscope, an accelerometer, a position sensor, a speed sensor, and/or a steering sensor/actuator providing measurements of an orientation, position, acceleration, speed, and/or steering angle of the mobile structure. In some embodiments, the controller may be adapted to execute one or more control loops to model and/or control navigation of the mobile structure during a docking assist. The system may be configured to receive measured or modeled sensor signals and provide docking assist control signals, as described herein. For example, the sensors may be mounted to or within the mobile structure (e.g., a watercraft, aircraft, motor vehicle, and/or other mobile structure), or may be integrated with the controller. Various embodiments of the present disclosure may be configured to automatically coordinate steering actuator operations with various orientation and/or position measurements to provide relatively high quality and low noise directional control.

Figure 1A:
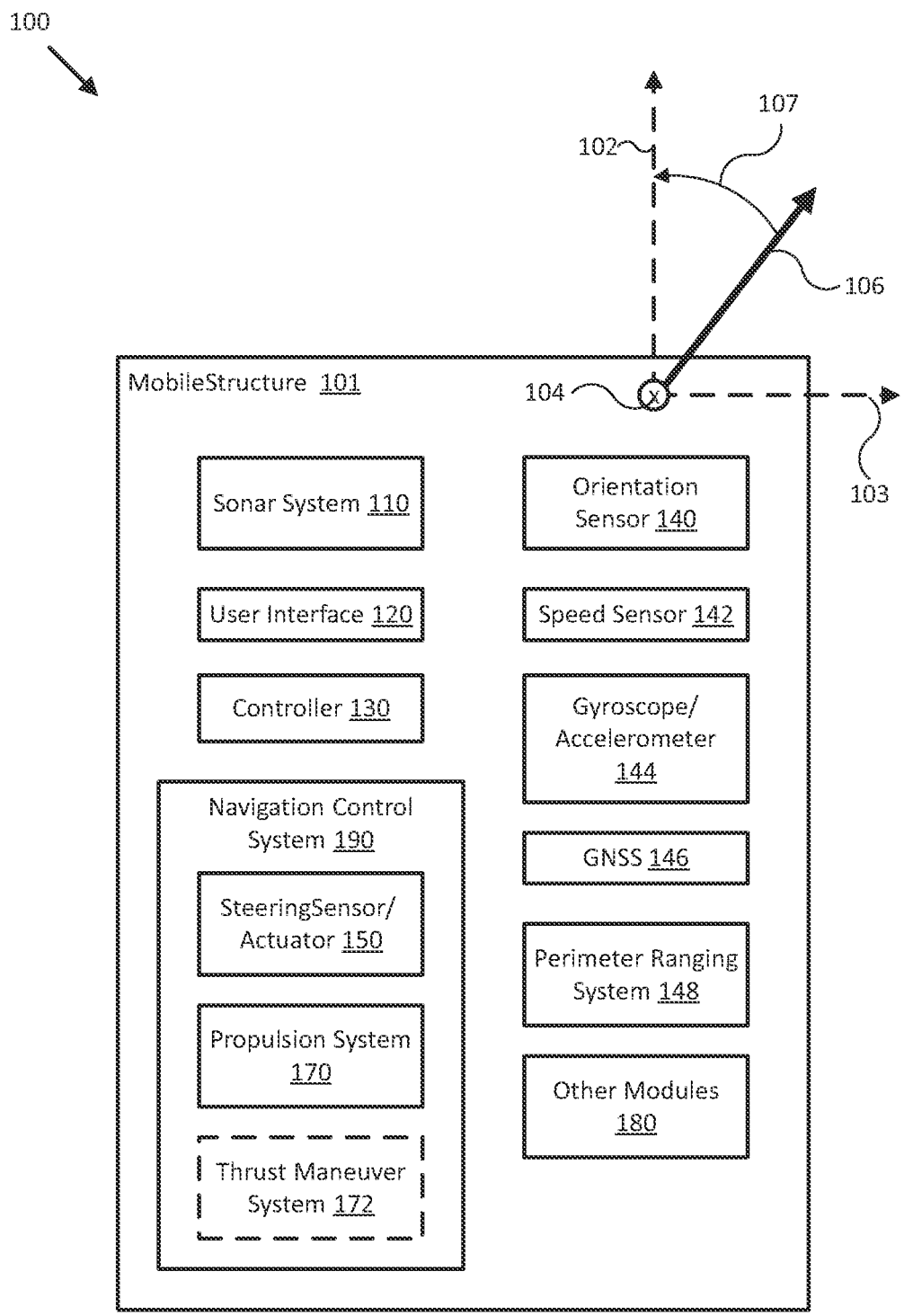
FIG. 1A illustrates a block diagram of a mobile structure including a docking assist system in accordance with an embodiment of the disclosure.

As an example, FIG. 1A illustrates a block diagram of system 100 in accordance with an embodiment of the disclosure. In various embodiments, system 100 may be adapted to provide docking assist for a particular mobile structure 101. Docking assist of a mobile structure may refer to fully automated docking of the mobile structure, for example, or to assisted docking of the mobile structure, where the system compensates for detected navigation hazards (e.g., such as an approaching dock) and/or various environmental disturbances (e.g., such as a cross wind or a water current) while assisting direct user control of mobile structure maneuvers. Such docking assist may include control of yaw, yaw rate, and/or linear velocity of mobile structure 101. In some embodiments, system 100 may be adapted to measure an orientation, a position, and/or a velocity of mobile structure 101, a relative or absolute wind, and/or a water current. System 100 may then use these measurements to control operation of mobile structure 101, such as controlling elements of navigation control system 190 (e.g., steering actuator 150, propulsion system 170, and/or optional thrust maneuver system 172) to steer or orient mobile structure 101 according to a desired heading or orientation, such as heading angle 107, for example.

In the embodiment shown in FIG. 1A, system 100 may be implemented to provide docking assist for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global navigation satellite system (GNSS) 146, a perimeter ranging system 148, a steering sensor/actuator 150, a propulsion system 170, a thrust maneuver system 172, and one or more other sensors and/or actuators used to sense and/or control a state of mobile structure 101, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation).

In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented with one or more electrically and/or mechanically coupled controllers, transmitters, receivers, transceivers, signal processing logic devices, autonomous power systems, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding ultrasonic returns, and convert the ultrasonic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing, as described herein.

For example, in various embodiments, sonar system 110 may be implemented and/or operated according to any one or combination of the systems and methods described in U.S. Provisional Patent Application 62/005,838 filed May 30, 2014 and entitled "MULTICHANNEL SONAR SYSTEMS AND METHODS", U.S. Provisional Patent Application 61/943,170 filed Feb. 21, 2014 and entitled "MODULAR SONAR TRANSDUCER ASSEMBLY SYSTEMS AND METHODS", and/or U.S. Provisional Patent Application 62/087,189 filed Dec. 3, 2014 and entitled "AUTONOMOUS SONAR SYSTEMS AND METHODS", each of which are hereby incorporated by reference in their entirety. In other embodiments, sonar system 110 may be implemented according to other sonar system arrangements that can be used to detect objects within a water column and/or a floor of a body of water.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine various coordinate frames and/or orientations, determine parameters for one or more coordinate frame transformations, and/or perform coordinate frame transformations, for example, or to perform various other processes and/or methods described herein.

In some embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101 and/or other elements of system 100. In such embodiments, user interface 120 may be adapted to process the sensor signals to determine sensor information indicating an estimated and/or absolute roll, pitch, and/or yaw (attitude and/or rate), and/or a position or series of positions of mobile structure 101 and/or other elements of system 100, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101 and/or other element of system 100. For example, user interface 120 may be adapted to display a time series of positions, headings, and/or orientations of mobile structure 101 and/or other elements of system 100 overlaid on a geographical map, which may include one or more graphs indicating a corresponding time series of actuator control signals, sensor information, and/or other sensor and/or control signals.

In some embodiments, user interface 120 may be adapted to accept user input including a user-defined target heading, waypoint, route, and/or orientation for an element of system 100, for example, and to generate control signals for navigation control system 190 to cause mobile structure 101 to move according to the target heading, waypoint, route, track, and/or orientation. In other embodiments, user interface 120 may be adapted to accept user input modifying a control loop parameter of controller 130, for example, or selecting a responsiveness of controller 130 in controlling a direction (e.g., through application of a particular steering angle) of mobile structure 101.

For example, a responsiveness setting may include selections of Performance (e.g., fast response), Cruising (medium response), Economy (slow response), and Docking responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 130, as described herein. For docking responsiveness, control loop responsiveness may be fast and coupled with relatively low maximum acceleration limits.

In further embodiments, user interface 120 may be adapted to accept user input including a user-defined target attitude, orientation, and/or position for an actuated device (e.g., sonar system 110) associated with mobile structure 101, for example, and to generate control signals for adjusting an orientation and/or position of the actuated device according to the target attitude, orientation, and/or position. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of navigation control system 190, mobile structure 101, and/or other elements of system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine-readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120) and/or may share a communication module or modules.

As noted herein, controller 130 may be adapted to execute one or more control loops to model or provide device control, steering control (e.g., using navigation control system 190) and/or performing other various operations of mobile structure 101 and/or system 100. In some embodiments, a control loop may include processing sensor signals and/or sensor information in order to control one or more operations of mobile structure 101 and/or system 100.

For example, controller 130 may be adapted to receive a measured heading 107 of mobile structure 101 from orientation sensor 140, a measured steering rate (e.g., a measured yaw rate, in some embodiments) from gyroscope/accelerometer 144, a measured speed from speed sensor 142, a measured position or series of absolute and/or relative positions from GNSS 146, a measured steering angle from steering sensor/actuator 150, perimeter sensor data from perimeter ranging system 148, and/or a user input from user interface 120. In some embodiments, a user input may include a target heading 106, for example, an absolute position and/or waypoint (e.g., from which target heading 106 may be derived), and/or one or more other control loop parameters. In further embodiments, controller 130 may be adapted to determine a steering demand or other control signal for navigation control system 190 based on one or more of the received sensor signals, including the user input, and provide the steering demand/control signal to steering sensor/actuator 150 and/or navigation control system 190.

In some embodiments, a control loop may include a nominal vehicle predictor used to produce a feedback signal corresponding to an average or nominal vehicle/mobile structure rather than one specific to mobile structure 101. Such feedback signal may be used to adjust or correct control signals, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual mobile structure.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide a pitch, pitch rate, roll, roll rate, yaw, and/or yaw rate for mobile structure 101 (e.g., using a time series of orientation measurements). In such embodiments, controller 130 may be configured to determine a compensated yaw rate based on the provided sensor signals. In various embodiments, a yaw rate and/or compensated yaw rate may be approximately equal to a steering rate of mobile structure 101. Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101. For example, speed sensor 142 may be configured to provide an absolute or relative wind velocity or water current velocity impacting mobile structure 101. In various embodiments, system 100 may include multiple embodiments of speed sensor 142, such as one wind velocity sensor and one water current velocity sensor.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). In some embodiments, gyroscope/accelerometer 144 may be adapted to determine pitch, pitch rate, roll, roll rate, yaw, yaw rate, compensated yaw rate, an absolute speed, and/or a linear acceleration rate of mobile structure 101. Thus, gyroscope/accelerometer 144 may be adapted to provide a measured heading, a measured steering rate, and/or a measured speed for mobile structure 101. In some embodiments, gyroscope/accelerometer 144 may provide pitch rate, roll rate, yaw rate, and/or a linear acceleration of mobile structure 101 to controller 130 and controller 130 may be adapted to determine a compensated yaw rate based on the provided sensor signals. Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GNSS 146 may be implemented as a global positioning satellite receiver and/or other device capable of determining an absolute and/or relative position of mobile structure 101 based on wireless signals received from space-born and/or terrestrial sources, for example, and capable of providing such measurements as sensor signals that may be communicated to various devices of system 100. In some embodiments, GNSS 146 may be adapted to determine and/or estimate a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information. GNSS 146 may also be used to estimate a relative wind velocity or a water current velocity, for example, using a time series of position measurements while mobile structure is otherwise lacking powered navigation control.

Perimeter ranging system 148 may be adapted to detect navigation hazards within a monitoring perimeter of mobile structure 101 (e.g., within a preselected or predetermined range of a perimeter of mobile structure 101) and measure ranges to the detected navigation hazards (e.g., the closest approach distance between a perimeter of mobile structure 101 and a detected navigation hazard) and/or relative velocities of the detected navigation hazards. In some embodiments, perimeter ranging system 148 may be implemented by one or more ultrasonic sensor arrays distributed along the perimeter of mobile structure 101, radar systems, short range radar systems (e.g., including radar arrays configured to detect and/or range objects between a few centimeters and 10 s of meters from a perimeter of mobile structure 101), visible spectrum and/or infrared/thermal imaging modules or cameras, stereo cameras, LIDAR systems, combinations of these, and/or other perimeter ranging systems configured to provide relatively fast and accurate perimeter sensor data (e.g., so as to accommodate suddenly changing navigation conditions due to external disturbances such as tide and wind loadings on mobile structure 101). An embodiment of perimeter ranging system 148 implemented by cameras mounted to watercraft is discussed with reference to FIGS. 2A-I.

Navigation hazards, as used herein, may include an approaching dock or tie down post, other vehicles, floating debris, mooring lines, swimmers or water life, and/or other navigation hazards large and/or solid enough to damage mobile structure 101, for example, or that require their own safety perimeter due to regulation, safety, or other concerns. As such, in some embodiments, perimeter ranging system 148 and/or controller 130 may be configured to differentiate types of navigation hazards and/or objects or conditions that do not present a navigation hazard, such as seaweed, pollution slicks, relatively small floating debris (e.g., depending on a relative speed of the floating debris), and/or other non-hazardous but detectable objects.

Steering sensor/actuator 150 may be adapted to physically adjust a heading of mobile structure 101 according to one or more control signals, user inputs, and/or stabilized attitude estimates provided by a logic device of system 100, such as controller 130. Steering sensor/actuator 150 may include one or more actuators and control surfaces (e.g., a rudder or other type of steering mechanism) of mobile structure 101 and may be adapted to sense and/or physically adjust the control surfaces to a variety of positive and/or negative steering angles/positions.

Figure 1B:
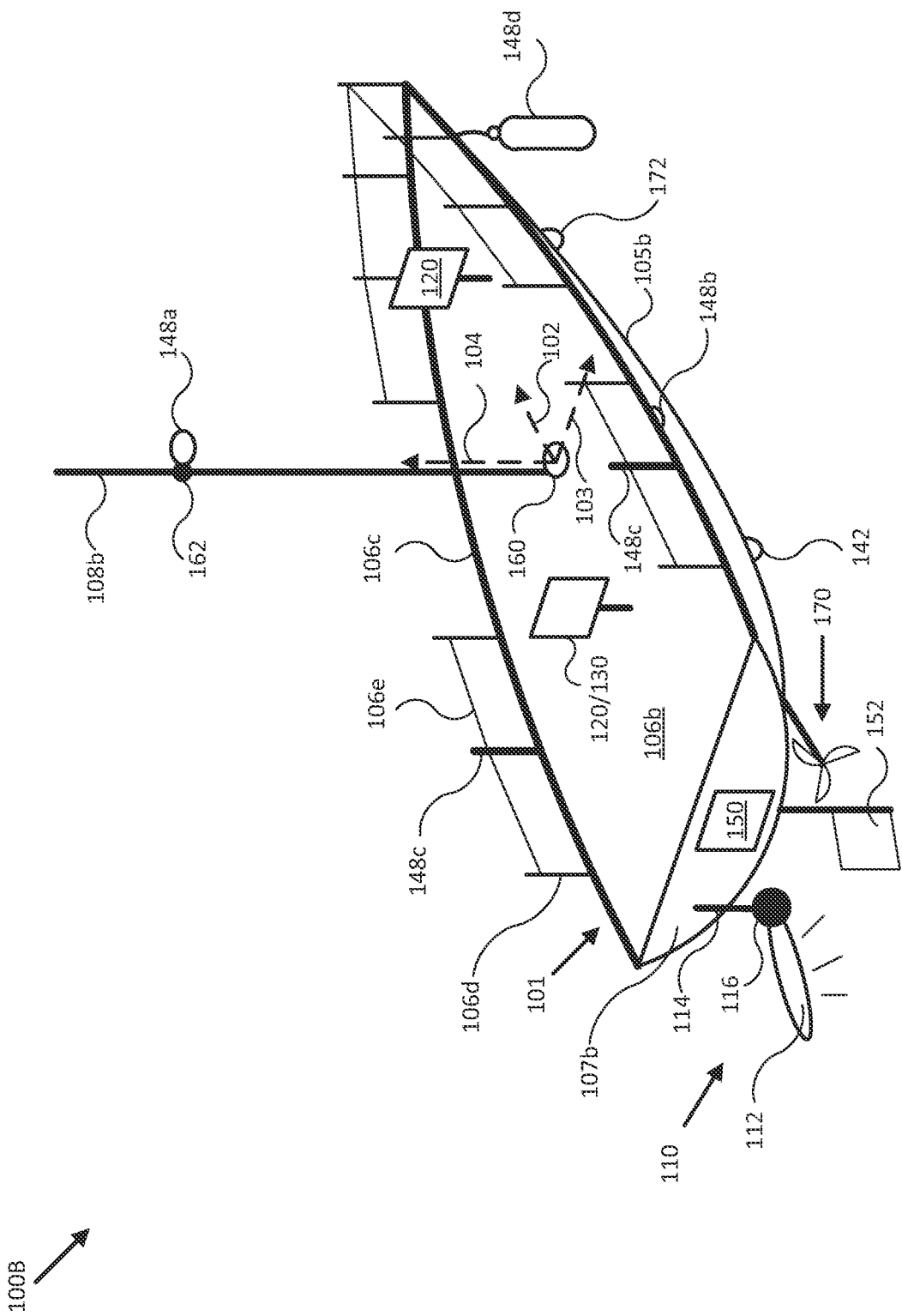
FIG. 1B illustrates a diagram of a watercraft including a docking assist system in accordance with an embodiment of the disclosure.
Figure 1C:
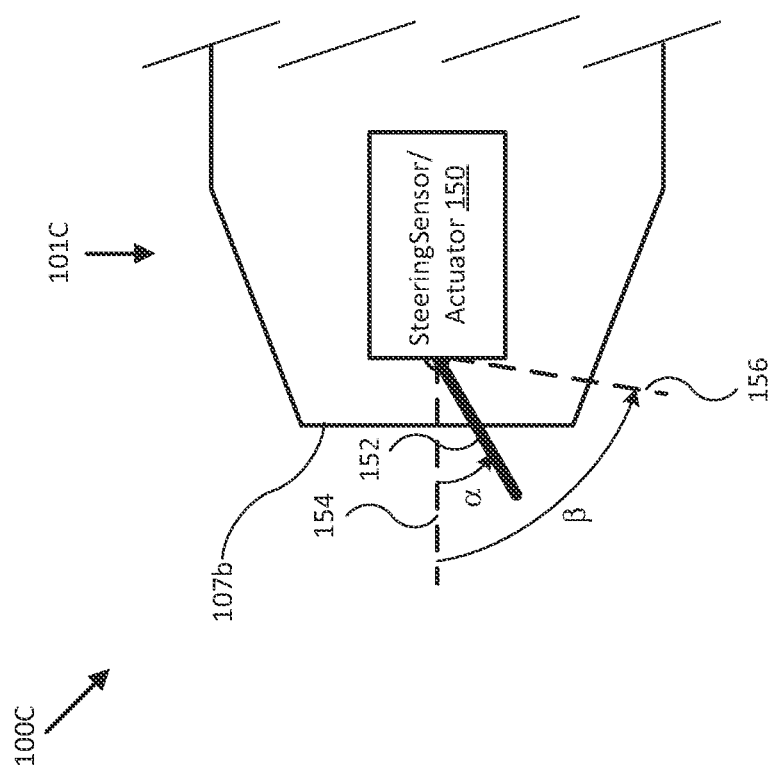
FIG. 1C illustrates a diagram of a steering sensor/actuator for a docking assist system in accordance with an embodiment of the disclosure.

For example, FIG. 1C illustrates a diagram of a steering sensor/actuator for a docking assist system 100C in accordance with an embodiment of the disclosure. As shown in FIG. 1C, rear portion 101C of mobile structure 101 includes steering sensor/actuator 150 configured to sense a steering angle of rudder 152 and/or to physically adjust rudder 152 to a variety of positive and/or negative steering angles, such as a positive steering angle $\alpha$ measured relative to a zero steering angle direction (e.g., designated by a dashed line 154). In various embodiments, steering sensor/actuator 150 may be implemented with a steering actuator angle limit (e.g., the positive limit is designated by an angle $\beta$ and a dashed line 156 in FIG. 1C), and/or a steering actuator rate limit "R".

As described herein, a steering actuator rate limit may be a limit of how quickly steering sensor/actuator 150 can change a steering angle of a steering mechanism (e.g., rudder 152), and, in some embodiments, such steering actuator rate limit may vary depending on a speed of mobile structure 101 along heading 104 (e.g., a speed of a ship relative to surrounding water, or of a plane relative to a surrounding air mass). In further embodiments, a steering actuator rate limit may vary depending on whether steering sensor/actuator 150 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 140, gyroscope/accelerometer 142, speed sensor 144, and/or GNSS 146, for example.

In various embodiments, steering sensor/actuator 150 may be implemented as a number of separate sensors and/or actuators, for example, to sense and/or control one or more steering mechanisms substantially simultaneously, such as one or more rudders, elevators, and/or automobile steering mechanisms, for example. In some embodiments, steering sensor/actuator 150 may include one or more sensors and/or actuators adapted to sense and/or adjust a propulsion force (e.g., a propeller speed and/or an engine rpm) of mobile structure 101, for example, to effect a particular docking assist maneuver (e.g., to meet a particular steering demand within a particular period of time), for instance, or to provide a safety measure (e.g., an engine cut-off and/or reduction in mobile structure speed).

In some embodiments, rudder 152 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of mobile structure 101, and/or other types or combination of types of steering mechanisms appropriate for mobile structure 101. In embodiments where rudder 152 is implemented, at least in part, as a system of fixed propellers and/or thrusters, steering angle α may represent an effective and/or expected steering angle based on, for example, characteristics of mobile structure 101, the system of fixed propellers and/or thrusters (e.g., their position on mobile structure 101), and/or control signals provided to steering sensor/actuator 150. An effective and/or expected steering angle α may be determined by controller 130 according to a pre-determined algorithm, for example, or through use of an adaptive algorithm for training various control loop parameters characterizing the relationship of steering angle α to, for instance, power levels provided to the system of fixed propellers and/or thrusters and/or control signals provided by controller 130, as described herein.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and/or may be coupled to and/or integrated with steering sensor/actuator 150, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example. As such, in some embodiments, propulsion system 170 may be integrated with steering sensor/actuator 150.

Figure 1D:
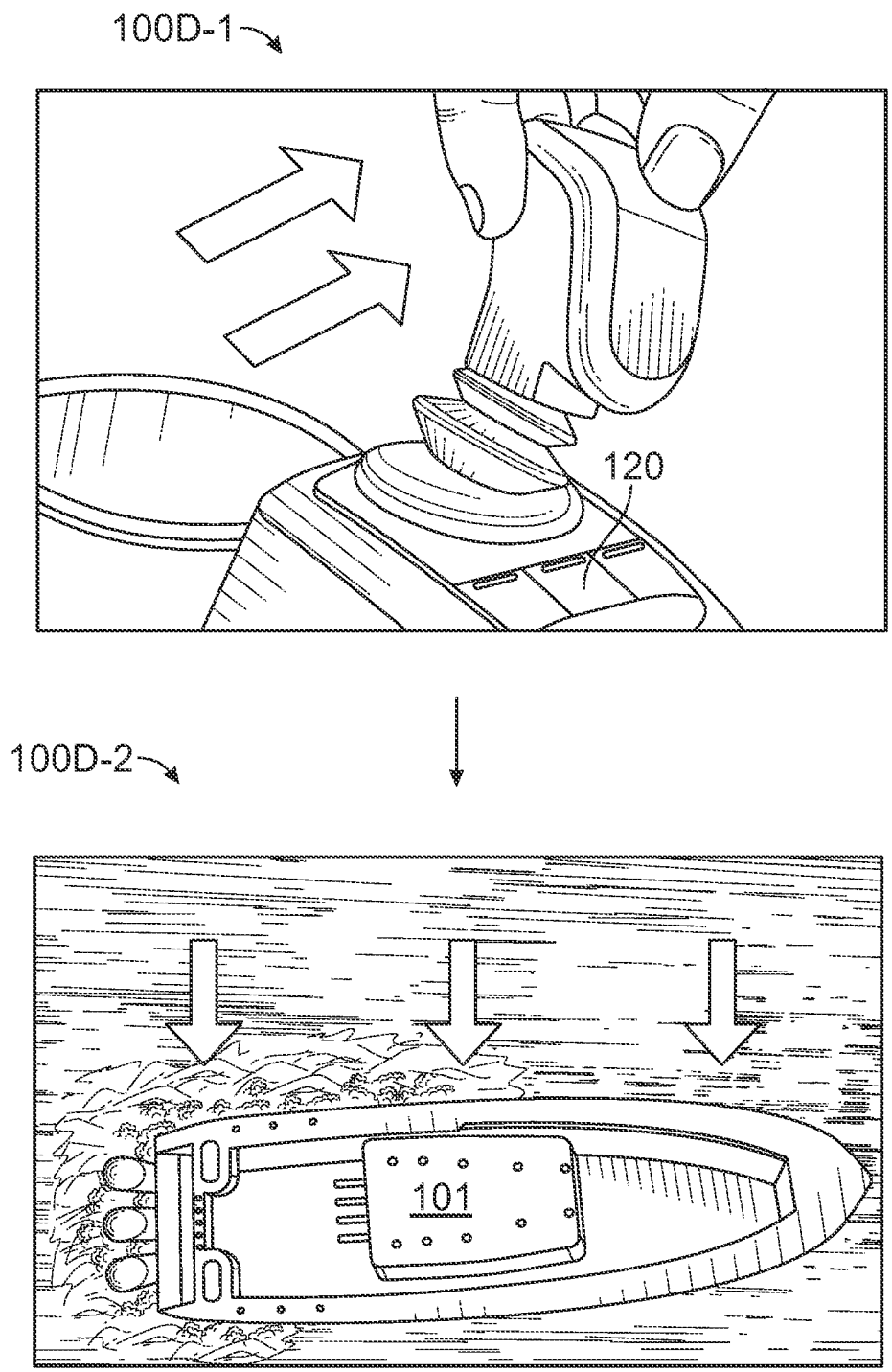
FIGS. 1D-E show diagrams illustrating operation of a thrust maneuver system for a docking assist system in accordance with an embodiment of the disclosure.
Figure 1E:
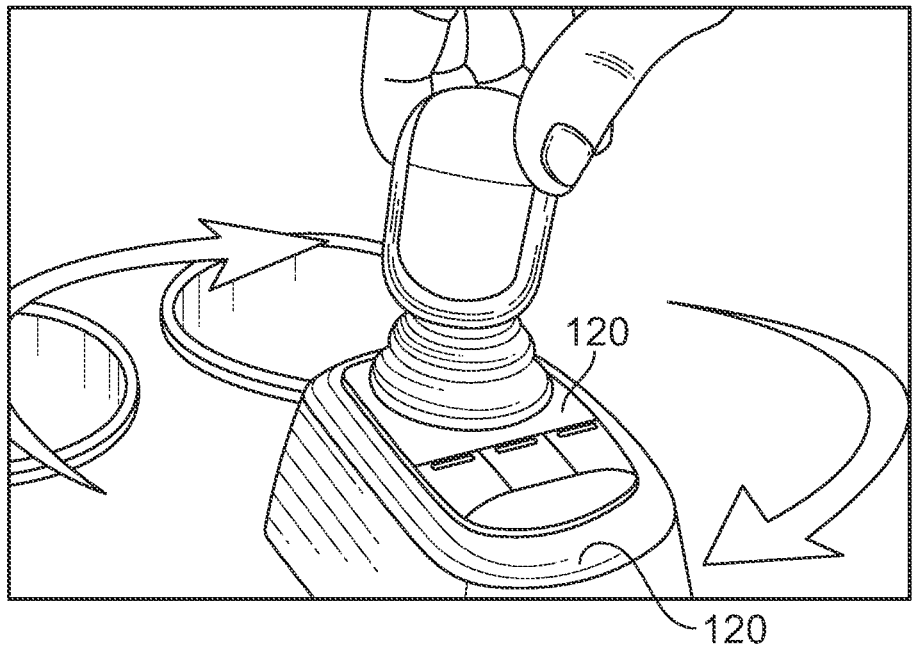
Figure 1E:
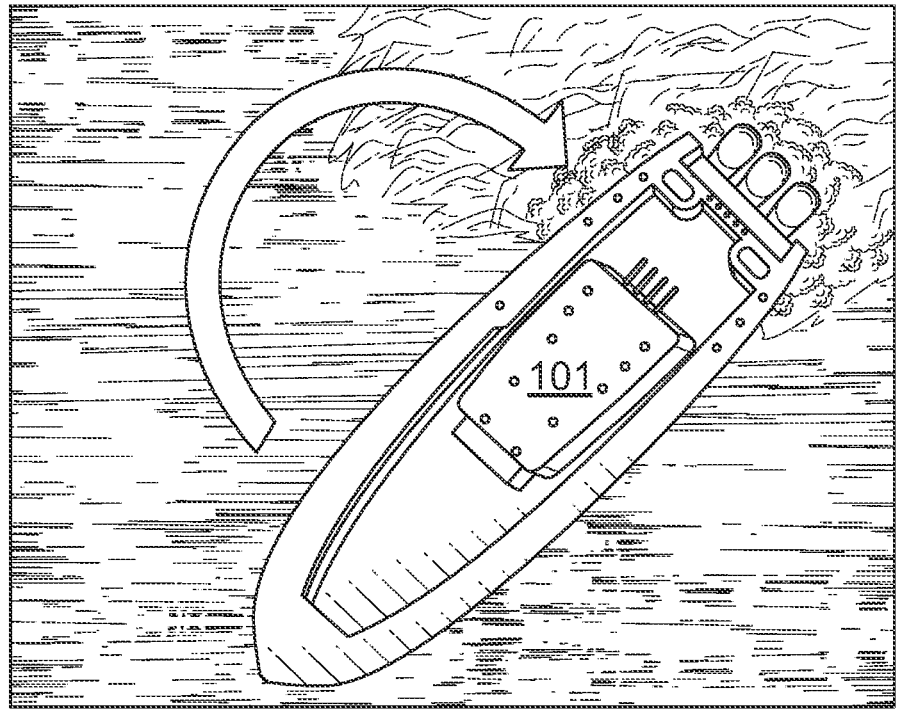

Optional thrust maneuver system 172 may be adapted to physically adjust a position, orientation, and/or linear and/or angular velocity of mobile structure 101 according to one or more control signals and/or user inputs provided by a logic device of system 100, such as controller 130. Thrust maneuver system 172 may be implemented as one or more directional propellers and/or vector thrusters (e.g., directional water jets), and/or a system of fixed propellers and/or thrusters coupled to mobile structure 101 that can be powered at different levels and/or reversed to maneuver mobile structure 101 according to a desired linear and/or angular velocity. For example, FIGS. 1D-E are diagrams illustrating operation of a thrust maneuver system for a docking assist system in accordance with an embodiment of the disclosure. As shown in diagram 100D-1 of FIG. 1D, joystick user interface 120 may be moved laterally by user input to produce the corresponding lateral velocity for mobile structure 101 shown in diagram 100D-2. Similarly, as shown in diagram 100E-1 of FIG. 1E, joystick user interface 120 may be rotated clockwise by user input to produce the corresponding clockwise angular velocity for mobile structure 101 shown in diagram 100E-2.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated and/or articulated devices (e.g., spotlights, visible and/or IR cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing any of the methods described herein, for example, including for transmitting and/or receiving communications, such as sensor signals, sensor information, and/or control signals, between one or more devices of system 100. In various embodiments, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein.

Sensor signals, control signals, and other signals may be communicated among elements of system 100 using a variety of wired and/or wireless communication techniques, including voltage signaling, Ethernet, WiFi, BLUETOOTH, ZIGBEE, XBEE, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries, capacitors, or other electrical power storage devices, for example, and may include one or more solar cell modules or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of other elements of system 100 to/from a coordinate frame of mobile structure 101, at-rest and/or in-motion, and/or other coordinate frames, as described herein. One or more logic devices of system 100 may be adapted to use such parameters to transform a coordinate frame of the other elements of system 100 to/from a coordinate frame of orientation sensor 140 and/or mobile structure 101, for example. Furthermore, such parameters may be used to determine and/or calculate one or more adjustments to an orientation of an element of system 100 that would be necessary to physically align a coordinate frame of the element with a coordinate frame of orientation sensor 140 and/or mobile structure 101, for example, or an absolute coordinate frame and/or other desired positions and/or orientations. Adjustments determined from such parameters may be used to selectively power adjustment servos/actuators (e.g., of various elements of system 100), for example, or may be communicated to a user through user interface 120, as described herein.

FIG. 1B illustrates a diagram of system 100B in accordance with an embodiment of the disclosure. In the embodiment shown in FIG. 1B, system 100B may be implemented to provide docking assist and/or other operational control of mobile structure 101, similar to system 100 of FIG. 1A. For example, system 100B may include integrated user interface/controller 120/130, secondary user interface 120, perimeter ranging systems 148a-d, steering sensor/actuator 150, sensor cluster 160 (e.g., orientation sensor 140, gyroscope/accelerometer 144, and/or GNSS 146), and various other sensors and/or actuators. In the embodiment illustrated by FIG. 1B, mobile structure 101 is implemented as a motorized boat including a hull 105b, a deck 106b, a toe rail 106c, an array of stanchions 106d linked by ropes or railings 106e, a transom 107b, a mast/sensor mount 108b, a rudder 152, an inboard motor 170, articulated thrust maneuver jet 172, an actuated sonar system 110 coupled to transom 107b, perimeter ranging system 148a (e.g., a camera system, radar system, and/or LIDAR system) coupled to mast/sensor mount 108b, optionally through roll, pitch, and/or yaw actuator 162, perimeter ranging system 148b (e.g., an ultrasonic sensor array and/or short range radar system) coupled to toe rail 106c or hull 105b substantially above a water line of mobile structure 101, perimeter ranging system 148c (e.g., an ultrasonic sensor array integrated with or coupled to one of stanchions 106d), and perimeter ranging system 148d (e.g., an ultrasonic sensor array integrated with or coupled to a bumper hung from one or more of toe rail 106c, stanchions 106d, and/or railings 106e. In other embodiments, hull 105b, deck 106b, mast/sensor mount 108b, rudder 152, inboard motor 170, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

As depicted in FIG. 1B, mobile structure 101 includes actuated sonar system 110, which in turn includes transducer assembly 112 coupled to transom 107b of mobile structure 101 through assembly bracket/actuator 116 and transom bracket/electrical conduit 114. In some embodiments, assembly bracket/actuator 116 may be implemented as a roll, pitch, and/or yaw actuator, for example, and may be adapted to adjust an orientation of transducer assembly 112 according to control signals and/or an orientation (e.g., roll, pitch, and/or yaw) or position of mobile structure 101 provided by user interface/controller 120/130. Similarly, actuator 162 may be adapted to adjust an orientation of perimeter ranging system 148a according to control signals and/or an orientation or position of mobile structure 101 provided by user interface/controller 120/130. For example, user interface/controller 120/130 may be adapted to receive an orientation of transducer assembly 112 and/or perimeter ranging system 148a (e.g., from sensors embedded within the assembly or device), and to adjust an orientation of either to maintain sensing/illuminating a position and/or absolute direction in response to motion of mobile structure 101, using one or more orientations and/or positions of mobile structure 101 and/or other sensor information derived by executing various methods described herein.

In related embodiments, perimeter ranging system 148b may be implemented as a short range radar system including one or more fixed radar antenna array assemblies (e.g., assembly 148b in FIG. 1B) each configured to generate steerable radar beams and mounted along hull 105b, deck 106b, transom 107b, and/or an interface between those, generally above the at-rest waterline associated with mobile structure 101, such as along a gunwale of mobile structure 101. Each antenna array assembly 148b may be configured to generate a relatively narrow radar beam, such as in the vertical direction (e.g., parallel to vertical axis 104) that may be steered to a desired relative roll or pitch (e.g., relative to an orientation of mobile structure 101) that substantially compensates for roll and/or pitch motion of mobile structure 101 about longitudinal axis 102 and/or lateral axis 103, respectively. In general, a monitoring perimeter associated such embodiments of perimeter ranging system 148b may be selected by a timing constraint, for example, or may be limited by a sensitivity and/or power output of perimeter ranging system 148b.

For example, design of a short-range radar system typically involves an engineering trade off in beam width, favoring narrow beams for higher density and detail, and wider beams in order to sense more area at once. In an environment without a fixed orientation, such as on a mobile structure, a wider beam width is often used to guarantee that an expected target may be in view while experiencing an expected amount of roll and pitch. Embodiments of perimeter ranging system 148b implemented as a short-range radar system may control one or more antenna array assemblies 148b to generate relatively narrow and high-resolution radar beams that may be focused on a particular target and/or according to a desired elevation (e.g., relative and/or absolute). In general, with respect to perimeter ranging system 148b, an absolute elevation may be defined as the vertical angle between the horizon (e.g., at zero degrees) and, for example, a steered beam generated by antenna array assembly 148b, and a relative elevation may be defined as the vertical angle between the plane defined by longitudinal axis 102 and lateral axis 103 of mobile structure 101, for example, and such steered beam.

In various embodiments, user interface/controller 120/130 may be configured to receive or determine an absolute roll and/or pitch of mobile structure 101 and control perimeter ranging system 148b to generate one or more vertically steered radar beams at desired absolute elevations based, at least in part, on the absolute orientation (e.g., roll and/or pitch) of mobile structure 101, an orientation of each antenna array assembly of perimeter ranging system 148b, a relative position of a target or navigation hazard detected by perimeter ranging system 148b, and/or an absolute or relative orientation and/or position of such target. Perimeter ranging system 148b may be configured to derive perimeter sensor data from such generated radar beams and provide the perimeter sensor data to user interface/controller 120/130, as described herein.

Such beam may be relatively narrow in a single dimension (e.g., 1, 5, or 10 degrees in vertical or elevation width, or within the range of 1 to 10 degrees in vertical width) or relatively narrow in overall angular diameter (e.g., 1, 5, or 10 degrees in angular diameter, or within the range of 1 to 10 degrees in angular diameter. More generally, such beam may be steered both vertically and horizontally (e.g., elevation and azimuth). Each antenna array assembly of perimeter ranging system 148b may include a number of different individual radar antenna elements, which may be arranged in a linear or two-dimensional spatial array to facilitate a particular desired beam shape, width, diameter, and/or steering range. In particular embodiments, each antenna array assembly may include a 3, 5, or 9 element vertical linear array of radar antenna elements, for example, or multiples of such linear arrays to form two dimensional arrays.

When used to facilitate docking assist and/or navigational control for mobile structure 101, one or more antenna array assemblies of perimeter ranging system 148b may be used to generate radar beams substantially at a preset or user selected absolute elevation selected to detect approaching docking hazards, such as zero degrees absolute elevation. In embodiments where such antenna array assemblies are themselves mounted to hull 105b with a relative elevation of approximately −10 degrees (e.g., directed at an absolute elevation of −10 degrees when vertical axis 104 is aligned with gravity), and mobile structure 101 is experiencing roll and/or pitch of +−5 degrees, perimeter ranging system 148b may be configured to generate radar beams steered to compensate for such roll and/or pitch with relative elevations ranging between 5 and 15 degrees, thereby maintaining an absolute elevation of zero degrees. Using such techniques to generate radar beams allows embodiments of perimeter ranging system 148b to reliably detect and provide ranges between a perimeter of mobile structure 101 and various navigation hazards occurring during docking assist maneuvers, for example, and/or more general navigation, as described herein. Similar techniques may be used with ultrasonic perimeter ranging sensor assemblies, as described herein.

In one embodiment, user interfaces 120 may be mounted to mobile structure 101 substantially on deck 106b and/or mast/sensor mount 108b. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106b) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105b, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105b. In alternative embodiments, speed sensor 142 may be implemented as a wind velocity sensor, for example, and may be mounted to mast/sensor mount 108b to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108b (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cell modules or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Each type of perimeter ranging system includes a variety of its own complications when used to implement a docking assist system, and a reliable and accurate perimeter ranging system is necessary for docking assist because GNSS data and cartography data for docks lack sufficient detail and resolution to provide safe docking assist by themselves and because, regardless of improvements in GNSS technology and cartography, there are often many uncharted navigation hazards associated with docking. As an example, conventional radar systems can be relatively easy to retrofit onto a mobile structure, if mounted conventionally high up on mobile structure 101, but they typically suffer from relatively low resolution and so can be unable to detect small objects, such as mooring lines. If mounted conventionally high, a conventional radar system would provide ranging data to controller 130, and controller 130 would be configured to use knowledge of the profile for mobile structure 101 and a measured orientation of mobile structure 101 to determine perimeter sensor data for a detected navigation hazard (e.g., the closest approach distance between a perimeter of mobile structure 101 and the detected navigation hazard). However, by being mounted high, the conventional radar system would typically miss low profile navigation hazards commonly encountered when docking a mobile structure, such as the leading edge of a dock floating minimally above a waterline, particularly as it approaches within a meter of a perimeter of mobile structure 101.

Conventional radar systems may instead be mounted relatively low (e.g., pontoon height) to reliably range such low profile navigation hazards, but this would increase mounting costs and complexity and still result in a system that could miss small but important detail either due to resolution issues or due to conventional beam shapes and corresponding detection areas being too narrow at the point of emission and lacking substantial vertical coverage. Furthermore, if mounted low, a conventional radar system couldn't be used while underway at sea (e.g., due to wave clutter), would be subject to increased risk of damage during docking and/or due to immersion (e.g., sail boat heeled over while underway), would be difficult to mount aesthetically and/or require holes in the hull, and might require extensive cabling routing. As such, conventional radar can be a useful and relatively inexpensive complimentary sensor for a docking assist system, particularly when mounted conventionally to a mast, but would typically require supplemental perimeter sensor data from a separate perimeter ranging system to provide reliable and safe docking assist.

Alternatives include ultrasonic sensor arrays, LIDAR systems, and short-range radar systems. Lidar is improving rapidly and has the advantage of being able to detect navigation hazards without ambient light. Lidar produces a 3d point cloud and so is suited to measuring distances to the dock, and analytics to determine dock/obstacle vs water are straightforward since the water is substantially a flat plane and objects more than a predetermined threshold above this plane can be designated as navigation hazards. The LIDAR data can be rendered as an image from an elevated perspective, making it relatively easy and intuitive for a user to designate a target docking position. However, LIDAR is currently expensive, especially if multiple installations are required to get a clear view of the perimeter of mobile structure 101 (e.g., port and starboard installations). Short range radar systems (e.g., including approximate square centimeter sized two and/or three dimensional radar antenna arrays configured to detect and/or range objects between a few centimeters and 10 s of meters away) are also improving rapidly, but such systems could be relatively prone to damage and would be relatively complex to mount and wire along a perimeter of mobile structure 101 in order to provide sufficient coverage for common docking assist maneuvers.

A less expensive alternative, according to embodiments disclosed herein, is one or more cameras (e.g., including visible spectrum and/or infrared/thermal imaging modules) mounted relatively high on mobile structure 101 to provide a sufficient monitoring perimeter around mobile structure 101 and a sufficient vertical perspective of a perimeter of mobile structure 101 to reliably detect and range navigation hazards relatively close to the perimeter of mobile structure 101 (e.g., within a meter of the perimeter of mobile structure 101). Each camera may include a microelectromechanical systems (MEMS) based gyroscope/accelerometer sensor (e.g., similar to gyroscope/accelerometer 144) configured to provide a vertical reference (e.g., corresponding to the gravitational "down" vector) for images captured by the camera, for example, and/or the camera and/or controller 130 may be configured to determine a horizontal reference (e.g. corresponding to a horizon, such as where the sea surface meets the horizon). From these references and a known height of the camera, reliable and precise ranges between a perimeter of mobile structure 101 and a detected navigation hazard can be determined, and without need of supplemental perimeter sensor data and/or perimeter ranging systems, as described herein. Alternatively any of such cameras may be implemented as stereo cameras that are able to determine the height of the camera above a surface based on parallax effects such as the pixel position of a detected structure in a first image captured by a first imaging module of the stereo camera being at a different pixel position in a second image captured by a second imaging module of the stereo camera at approximately the same time the first image is captured.

Conventional ultrasonic sensor arrays typically do not provide sufficient resolution and range to detect relatively small navigation hazards or to allow a user to specify a docking location, and so, like conventional radar systems, conventional ultrasonic sensor arrays would typically need supplemental perimeter sensor data from a separate perimeter ranging system to provide reliable and safe docking assist, which would increase system cost and complexity. Embodiments of the ultrasonic perimeter ranging sensor assemblies described herein may include relatively small individual transducer/sensor elements and be implemented with their own microcontroller and/or wireless communications module so as not to require relatively expensive shielded sensor wiring to each element. Such embodiments may be permanently mounted to portions of mobile structure 101 (e.g., toe rail 106c to form part of perimeter ranging system 148b, stanchions 106d to form part of perimeter ranging system 148c), for example, or may be low power and portable enough to be periodically strapped to or draped over portions of mobile structure 101 (e.g., strapped to select ones of stanchions 106d to form part of perimeter ranging system 148c, integrated with a bumper or fender and draped over the side of hull 105b from one or more of toe rail 106c, stanchions 106d, or railings 106e), as described herein.

In various embodiments, each ultrasonic perimeter ranging sensor assembly can measure and digitally communicate perimeter ranges and/or range profiles, such as two or three-dimensional range profiles, to controller 130. For example, a series of such range and/or range profile measurements may be used to determine a relative velocity of a navigation hazard within a monitoring perimeter of the sensor assemblies. In general, a monitoring perimeter associated with each sensor assembly and/or array of sensor assemblies may be selected by a timing constraint, for example, or may be limited by a sensitivity and/or power output of such assemblies.

Figure 2:
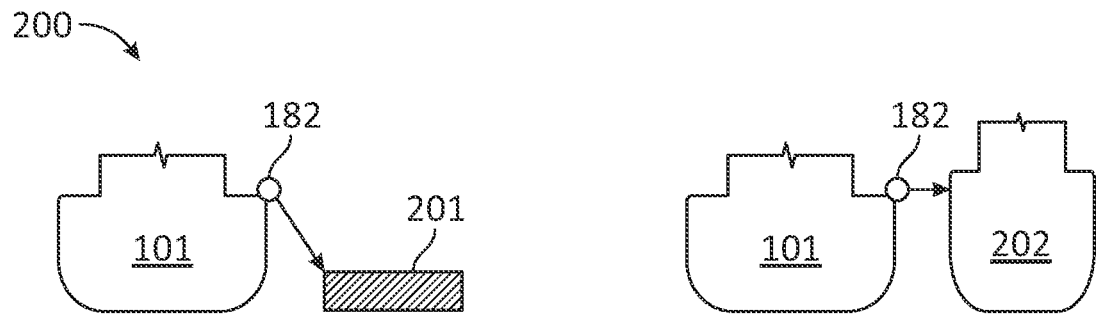
FIGS. 2-3 show diagrams illustrating various aspects of a perimeter ranging system for a docking assist system in accordance with an embodiment of the disclosure.
Figure 3:
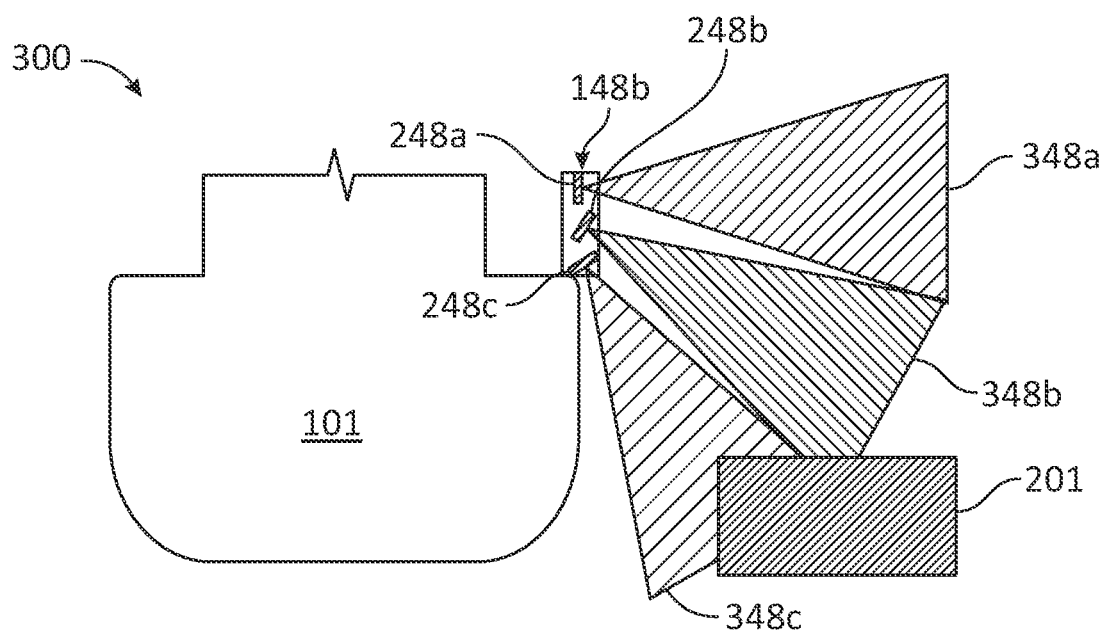

FIGS. 2-3 show diagrams 200-300 illustrating various aspects of perimeter ranging system 148 for docking assist system 100 in accordance with an embodiment of the disclosure. To assist or automate the docking of a marine vessel, it is useful to know the proximity to obstacles, and automotive ultrasonic sensors, such as those embedded in car bumpers, are widely available and low cost. However, unlike automotive applications where bumpers are close to ground level and can easily be drilled, it is not acceptable to drill holes in the hull of a vessel just above the waterline since this creates water integrity and aesthetic issues. Raising the mounting point of the sensors to the toe-rail or above creates ranging uncertainty as can be seen in diagram 200 of FIG. 2. On the left side of diagram 200, mobile structure 101 is fitted with a conventional ultrasonic sensor 182 roughly at deck level, and it is measuring a range to navigation hazard 201 (a dock or pontoon) along the first arrow as shown. On the right side of diagram 200, conventional ultrasonic sensor 182 is measuring a range to a taller navigation hazard 202 (a ship) along the second arrow as shown. In these two examples, the hull of mobile structure 101 is the same nearest-distance from both hazards, but navigation hazard 201 is a low-lying pontoon whereas navigation hazard 202 is a neighboring watercraft. The reported line of sight distance from a wide-angle ultrasonic sensor 182 is a reliable measure of collision distance in the case of the slab-sided neighbor, but not for the dock/pontoon. Also, for maritime applications, the range requirement is greater than for automotive (e.g., ~15 m vs ~3 m). Finally, the cabling associated with an array of such conventional ultrasonic sensors is not straightforward for boat builders or retrofit installations, and sensors should be discrete and easy to install on a wide variety of watercraft with minimal disruption to the design or aesthetics.

Diagram 300 of FIG. 3 illustrates an embodiment of perimeter ranging system 148b (e.g., and/or 148c) including multiple ultrasonic transducer elements 248a-c each aimed a different direction to form differentiated beams 348a-c and corresponding monitoring areas. Such system may be used to determine and/or differentiate horizontal distance from slant distance with toe-rail or stanchion mounted ultrasonic perimeter ranging sensor assemblies, and to detect narrow objects such as posts. Such assemblies may be mounted relatively compactly and inexpensively, including by bonding into toe-rails, strapping to guard rails, or mounting into marine bumpers or fenders, and with minimal or no need for cabling, as described herein. In the embodiment depicted in FIG. 3, perimeter ranging system 148b may be implemented with multiple differently aimed and relatively narrow beam ultrasonic transducers/transducer elements 248a-c, where the relatively narrow beam shape increases their individual ranging capability, and the disparate aiming allows such embodiments to distinguish between low lying and high standing navigation hazards, as shown where navigation hazard 201 intersects beams 348b-c and not 348a.

Such discrimination may also be achieved in the temporal domain by tracking navigation hazard 201 through the different beams 348a-c. For example, as mobile structure 101 approaches navigation hazard 201, initially beam 348a will detect and range navigation hazard 201 (e.g., ultrasonic transducer 248a of ultrasonic perimeter ranging sensor assembly 148b will provide associated perimeter sensor data) due to the spread of beam 348a across the horizon, while beams 348b-c extinguish at the water surface closer to mobile structure 101. After a period of time, beam 348b will detect and range navigation hazard 201, and then after another period of time, beam 348c will detect and range navigation hazard 201.

The perimeter sensor data from each ultrasonic transducer, as well as the timings and ranges associated with first detection, may be converted into a sensor approach velocity for navigation hazard 201. For a stationary navigation hazard 201, the absolute velocity of mobile structure 101 (e.g., as measured by GNSS 146 or other absolute velocity sensor) should be equal to the sensor approach velocity multiplied by the cosine of the dip angle from sensor to navigation hazard 201. The dip angle changes as navigation hazard 201 approaches and can itself be tracked and estimated using a Kalman filter or equivalent, since there are two sources of information and two unknowns: each beam has a defined installed dip angle and height above the water, and the line-of-sight range (e.g., sensor range) is measured directly by each beam, and the horizontal distance to and the height of the nearest approach point of navigation hazard 201 are unknown.

Figure 4:
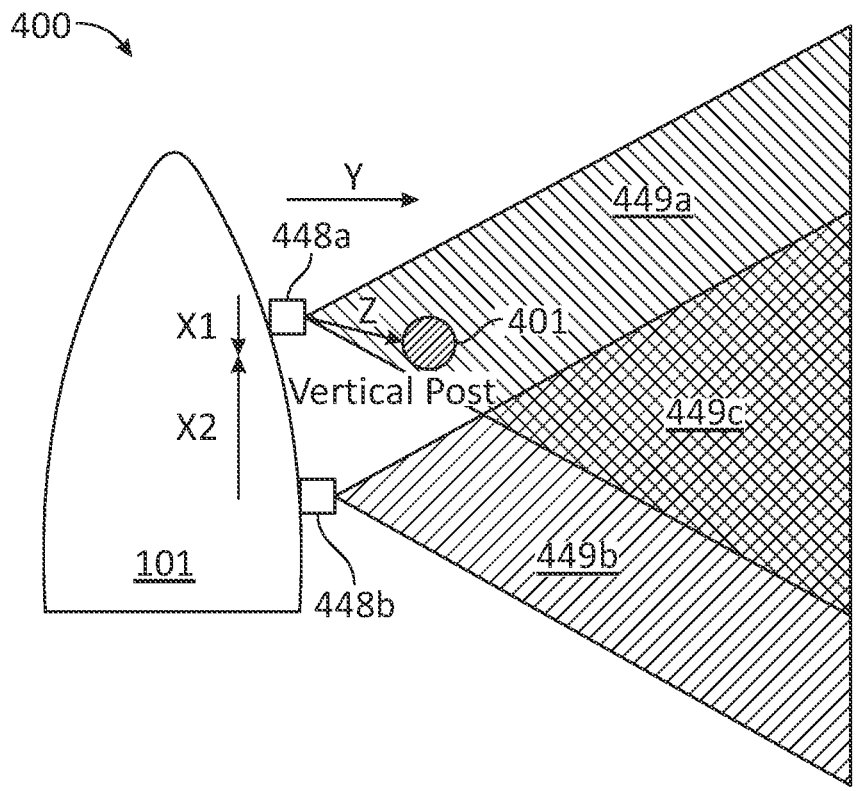
FIGS. 4-5 show diagrams illustrating various aspects of navigation hazard detection using a perimeter ranging system for a docking assist system in accordance with an embodiment of the disclosure.
Figure 5:
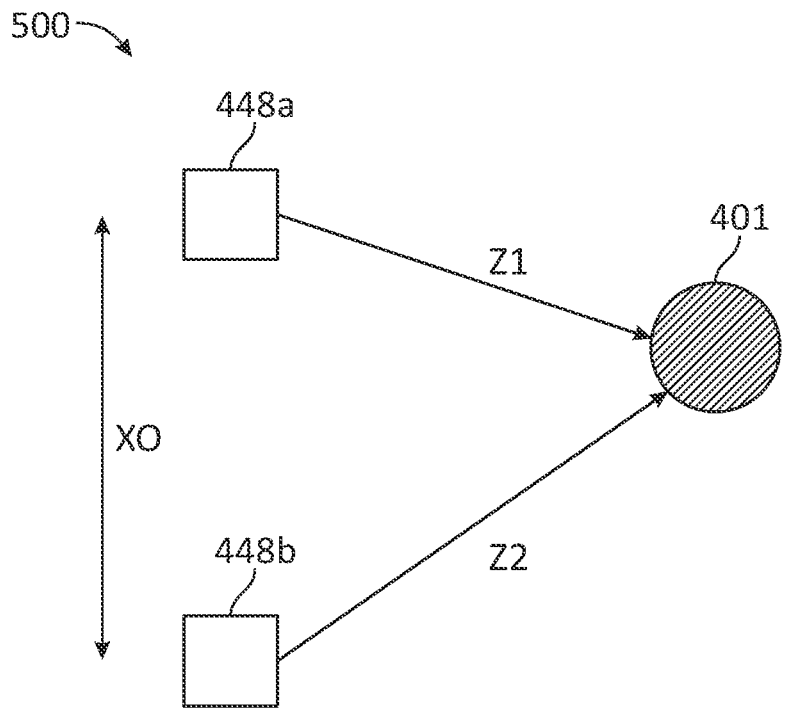

Temporal tracking can also be useful in the horizontal dimension, where a wider beam width is desirable (e.g., where the ultrasonic transducer elements are sized vertically taller than they are horizontally wide, relative to the surface of the water) since it may be less practicable to provide multiple sensor elements with different viewing directions (e.g., as shown in FIG. 3. For example, FIGS. 4-5 show diagrams 400-500 illustrating various aspects of navigation hazard detection using perimeter ranging system 148 for docking assist system 100 in accordance with an embodiment of the disclosure. Diagram 400 of FIG. 4 shows mobile structure 101 fitted with two ultrasonic perimeter ranging sensor assemblies 448a-b configured to generate respective beams 449a-b, with overlapping portions 449c. In FIG. 4, relatively narrow navigation hazard 401 (a vertical post) lies within beam 449a and not 449b or c, and longitudinal distances X1 and X2 are required in order to convert range Z into lateral (horizontal) distance Y, as shown.

There are multiple ways to obtain estimates for longitudinal distances X1 and X2. For example, system 100 may be configured to determine or detect the transition time of navigation hazard 401 appearing in both beams 449a-b to appearing in only one beam 449a, and then to use a known relationship between the orientations and widths of the two beams to spot navigation hazard 401 at a particular set of estimated longitudinal distances X1 and X2 at that transition time. From that point, system 100 may be configured to estimate longitudinal distances X1 and X2 based on the measured range Z as reported by beam 449a, for example, including based on prior detections while navigation hazard 401 resided in both beams. In another embodiment, system 100 may be configured to estimate longitudinal distances X1 and X2 based on an absolute velocity of mobile structure 101 (e.g., provided by GNSS 146) and a rate of change of measured range Z. While navigation hazard 401 resides within both beams, triangulation techniques may be used to determine lateral distance Y. For example, diagram 500 of FIG. 5 shows ultrasonic perimeter ranging sensor assemblies 448a-b separated by a known longitudinal spacing X0, and navigation hazard 401 is assumed to reside in both beams 449a-b (e.g., in overlapping area 449c). System 100 may be configured to use measured ranges Z1 and Z2 and a known longitudinal spacing XO to determine lateral (horizontal) distance Y, as shown.

Figure 6:
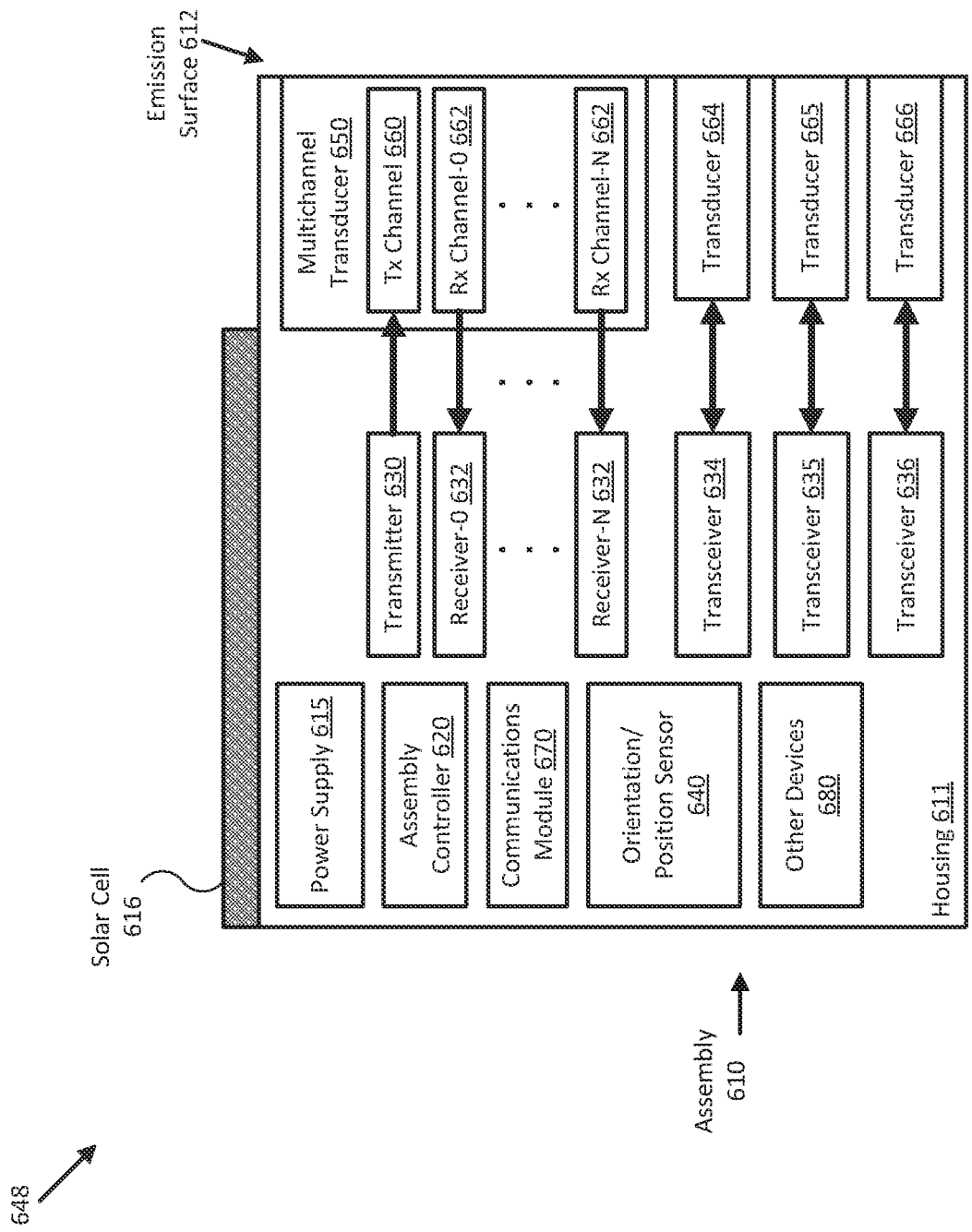
FIG. 6 illustrates a block diagram of an ultrasonic perimeter ranging system for a docking assist system in accordance with an embodiment of the disclosure.

FIG. 6 illustrates a diagram of an ultrasonic perimeter ranging system 648 in accordance with an embodiment of the disclosure. In the embodiment shown in FIG. 6, ultrasonic perimeter ranging system 648 includes at least one ultrasonic perimeter ranging sensor assembly 610 that can provide perimeter sensor data to a user interface or controller (e.g., user interface 120, controller 130 of FIG. 1A) of system 100 wirelessly. As shown, each ultrasonic perimeter ranging sensor assembly 610 may include one or more controllers (e.g., an assembly controller 620), ultrasonic transducers (e.g., multichannel ultrasonic transducer 650 and/or ultrasonic transducers 664-666), other sensors (e.g., orientation/position sensor 640 and/or a temperature sensor), and/or other devices facilitating operation of system 648 all disposed within a common housing 611.

Assembly controller 620 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of ultrasonic perimeter ranging sensor assembly 610 and/or system 648, for example, similar to controller 130. In typical embodiments, controller 620 may be tasked with overseeing general operation of ultrasonic perimeter ranging sensor assembly 610, communicating operational parameters and/or sensor information with other devices using communications module 670, and/or other operations of system 648, including generating digital transmission and/or sampling control signals for operating transmitters, receivers, transceivers, signal conditioners, and/or other devices of ultrasonic perimeter ranging sensor assembly 610, for example, and other time critical operations of system 648, such as per-sample digital beamforming and/or interferometry operations applied to signal returns from multichannel ultrasonic transducer 650, as described herein.

Transmitter 630 may be implemented with one or more digital to analog converters (DACs), signal shaping circuits, filters, phase adjusters, signal conditioning elements, amplifiers, timing circuitry, logic devices, and/or other digital and/or analog electronics configured to accept digital control signals from assembly controller 620 and to generate transmission signals to excite a transmission channel/transducer element of multichannel ultrasonic transducer 650 (e.g., transmission channel 660) to produce one or more ultrasonic beams. In some embodiments, operation of transmitter 630 (e.g., amplification, frequency dependent filtering, transmit signal frequency, duration, shape, and/or timing/triggering, and/or other signal attributes), may be controlled (e.g., through use of various control signals) by assembly controller 620, as described herein.

Each of receivers 632 (e.g., for N channels as shown) may be implemented with one or more analog to digital converters (ADCs), filters, phase adjusters, signal conditioning elements, amplifiers, timing circuitry, logic devices, and/or other digital and/or analog electronics configured to accept analog ultrasonic returns from a corresponding receive channel/transducer element of multichannel ultrasonic transducer 650 (e.g., receive channels 662), convert the analog ultrasonic returns into digital ultrasonic returns, and provide the digital ultrasonic returns to assembly controller 620. In some embodiments, operation of each receiver 632 (e.g., amplification, frequency dependent filtering, basebanding, sample resolution, duration, and/or timing/triggering, and/or other ADC/signal attributes) may be controlled by assembly controller 620. For example, assembly controller 620 may be configured to use receivers 632 to convert an ultrasonic return into a digital ultrasonic return comprising one or more digital baseband transmissions that are then provided to assembly controller 620. In some embodiments, receivers 632 may be configured to low-pass or otherwise filter, amplify, decimate, and/or otherwise process the acoustic and/or digital ultrasonic returns (e.g., using analog and/or digital signal processing) prior to providing the digital ultrasonic returns to assembly controller 620. In other embodiments, receivers 632 may be configured to provide substantially unprocessed (e.g., raw) analog and/or digital ultrasonic returns to assembly controller 620 for further signal processing, as described herein. In further embodiments, transmitter 630 and one or more of receivers 632 may be integrated into a single transceiver.

In the embodiment shown in FIG. 6, multichannel ultrasonic transducer 650 includes multiple transducer elements and/or transmission/receive channels that may be operated substantially independently of each other and be configured to emit ultrasonic beams and receive ultrasonic returns through emission surface 612 of housing 611. In some embodiments, multichannel ultrasonic transducer 650 may include a single transmission channel 660 and, separately, multiple receive channels 662. In other embodiments, multichannel ultrasonic transducer 650 may include multiple transmission channels. In further embodiments, transmission channel 660 may be implemented as both a transmission channel and a receive channel though use of a transceiver (e.g., similar to transceivers 634-636). In general, transmission channel 660 may be implemented as one, two, or many separate transducer elements configured to produce one or more ultrasonic beams. Each of receive channels 662 may also be implemented as one, two, or many separate transducer elements, but configured to receive ultrasonic returns. The effective volumetric shapes of the ultrasonic beams and ultrasonic returns may be determined by the shapes and arrangements of their corresponding transducer elements, as described herein. In various embodiments, the various channels of multichannel ultrasonic transducer 650 may be arranged to facilitate multichannel processing, such as beamforming, interferometry, inter-beam interpolation, and/or other types of multichannel processing used to produce perimeter sensor data and/or imagery.

For example, in one embodiment, multichannel ultrasonic transducer 650 may be implemented with multiple transmission channels 660 arranged in a phased array to allow electronic steering of relatively narrow ultrasonic beams (relative to those produced by a single transmission channel 660) within a relatively wide range of transmission angles. In such embodiments, ultrasonic perimeter ranging sensor assembly 610 may be configured to use such electronically steered beams (e.g., to perform sweep monitoring or targeted monitoring, for example) to improve signal-to-noise in resulting perimeter sensor data and/or imagery and/or to improve rejection of false targets detected in the corresponding ultrasonic returns. A related and less complex embodiment includes a transmission array implemented without phasing such that the resulting ultrasonic beam width can be adjusted by including or excluding transmission channels and/or elements. For example, such embodiments could be used to alternate between operation with long verses short range (e.g., 10 s of meters vs. 1 s of meters) where the ultrasonic beams could be switched between relatively narrow for long range and relative wide for short range.

In some embodiments, ultrasonic perimeter ranging sensor assembly 610 may be implemented with one or more additional or alternative ultrasonic transducers (e.g., ultrasonic transducers 664-666) separate from or as an alternative to multichannel ultrasonic transducer 650, and serviced by separate transmitter/receiver electronics similar to transmitter 630 and/or receivers 632 (e.g., transceivers 634-636, which may each include high voltage protection circuitry and/or transmit/receive switching to enable transmission and reception over the same leads). In various embodiments, operation of transceivers 634-636 and/or ultrasonic transducers 664-666 (e.g., and their constituent transducer elements) may be controlled by assembly controller 620, similar to control of transmitter 630 and/or receivers 632 described herein. Typically, transceivers 634-636 and/or ultrasonic transducers 664-666 may be configured to produce ultrasonic beams adapted to reduce or eliminate interference with operation of multichannel ultrasonic transducer 650, if present, or with operation of each other, such as by using a substantially different transmission frequency, modulation (e.g., chirp), timing, and/or beam shape, and/or by aiming the ultrasonic beams in a substantially non-interfering direction. In alternative embodiments, transceivers 634-636 and/or ultrasonic transducers 664-666 may be configured to generate ultrasonic beams that produce ultrasonic returns in multichannel ultrasonic transducer 650, similar to operation of transmitter 630 and transmission channel 660, but from an oblique angle relative to multichannel ultrasonic transducer 650. In such embodiments, the oblique ultrasonic returns may be used to generate perimeter ranging imagery with increased spatial differentiation and/or contrast between objects in the monitoring area monitored by ultrasonic perimeter ranging sensor assembly 610.

As shown, ultrasonic perimeter ranging sensor assembly 610 may be implemented with orientation/position sensor 640. Orientation/position sensor 640 may be implemented as one or more orientation sensors, GNSS receivers/sensors, differential GNSS receivers/sensors, orientation/position reference transducers and/or optical sensor (e.g., for actuators), and/or other sensors configured to measure a relative and/or absolute orientation and/or position of ultrasonic perimeter ranging sensor assembly 610 and/or multichannel ultrasonic transducer 650 and provide such measurements to controller 620 and/or assembly controller 620. In some embodiments, controller 620 and/or assembly controller 620 may be configured to combine perimeter ranging sensor/sonar data and/or imagery according to such measurements and/or measurements of an orientation and/or position of a coupled mobile structure to produce combined perimeter ranging sensor/sonar data and/or imagery, such as multiple co-registered perimeter ranging sensor/sonar images, for example, and/or three dimensional perimeter ranging sensor/sonar images. In other embodiments, controller 620 and/or assembly controller 620 may be configured to use orientation and/or position measurements of ultrasonic perimeter ranging sensor assembly 610 and/or a coupled mobile structure to control one or more actuators (e.g., other devices 680) to adjust a position and/or orientation of ultrasonic perimeter ranging sensor assembly 610 and ensonify a particular position and/or orientation using ultrasonic perimeter ranging sensor assembly 610 and/or multichannel ultrasonic transducer 650.

Other devices 680 may include other and/or additional sensors, sensor arrays, actuators, logic devices, communications modules/nodes, power distribution components, wired interfaces, and/or user interface devices used to provide additional environmental information and/or configuration parameters, for example, and/or to adjust a position and/or orientation of ultrasonic perimeter ranging sensor assembly 610. In some embodiments, other devices 680 may include an ambient temperature sensor, a visible spectrum camera, an infrared camera, and/or other environmental sensors providing measurements and/or other sensor signals that can be displayed to a user and/or used by other devices of ultrasonic perimeter ranging sensor assembly 610 (e.g., controller 620) to provide operational control of ultrasonic perimeter ranging sensor assembly 610. In some embodiments, other devices 680 may include one or more actuators adapted to adjust an orientation (e.g., roll, pitch, and/or yaw) and/or a position (longitudinal, lateral, and/or vertical) of ultrasonic perimeter ranging sensor assembly 610, multichannel ultrasonic transducer 650, and/or ultrasonic transducers 664-666, relative to a coupled mobile structure, in response to one or more control signals (e.g., provided by controller 620). In other embodiments, other devices 680 may include one or more brackets or securing mechanisms adapted to couple housing 611 to a mobile structure or a part of a mobile structure (e.g., a toe rail or stanchion).

In various embodiments, ultrasonic perimeter ranging sensor assembly 610 may be implemented in a single housing 611 with a wireless communications module 670 to simplify installation and use. For example, communications module 670 may be adapted to form a communication link to user interface 120, controller 130, and/or other element of system 100, such as according to a particular wireless networking protocol and/or parameters for a particular wireless networking protocol and/or wireless link (e.g., a password, an encryption key, a MAC address, a device identification number, a device operation profile, parameters for operation of a device, and/or other parameters), and provide perimeter sensor data and/or other sensor data generated by various elements of ultrasonic perimeter ranging sensor assembly 610. Power supply 615 may be implemented as one or more power conditioners, line filters, switching power supplies, DC to DC converters, voltage regulators, power storage devices (e.g., batteries, ultracapacitors), and/or other power supply devices configured to receive power from solar cell 616 and/or distribute power to the various other elements of ultrasonic perimeter ranging sensor assembly 610.

In many instances, it is desirable for ultrasonic perimeter ranging sensor assemblies 648 to be implemented as relatively compact units that can be integrated into toe-rail 106c or mounted to stanchions 106d without adversely affecting aesthetics. Solar harvesting is ideally suited to such applications, since the harvesting occurs throughout the day, but docking only lasts 10 minutes or so each day, and so the harvesting ratio is favorable. For example, inbound energy ~100 mW per cm$^2$, solar efficiency ~20% implies ~20 mW per cm$^2$. Ultrasonic perimeter ranging sensor assembly 610/system 648 including solar cell 616 can reliably count on 1 sun hour per day, and so a 1 cm$^2$ solar cell 616 can reliably provide ~20 mWh per day. Typical power consumption for an embodiment of ultrasonic perimeter ranging sensor assembly 610/system 648 can be ~120 mW for 10 minutes=20 mWh.

As noted herein, ultrasonic perimeter ranging sensor assembly 610 may be implemented with communications module 670, and so no wiring would be required, and a 1 cm$^2$ solar cell 616 could be integrated easily. Such compact and retrofittable assembly would then have dimensions ~2 cm×2 cm×10 cm (e.g., for the three separate ultrasonic transducer-only embodiment) and could be strapped to one of stanchions 106d using tie straps. Alternatively, for boat builders looking for tighter integration, a device could be provided which can be bonded into toe-rail 106c (e.g., into a slot of toe-rail 106c).

Another alternative integration technique would include integrating wireless embodiments of ultrasonic perimeter ranging sensor assembly 610 into bumpers or fenders (e.g., perimeter ranging system 148d). In such embodiments, coin cells could provide years of operation (there would be no benefit from solar harvesting if the bumpers or fenders are primarily stored in lockers). This approach eliminates the need for slant distance compensation, as described herein, because fenders and bumpers are generally placed at the right height and position to be directly in line with the closest navigation hazard (e.g., a dock). It also reduces the number of required sensors since a vessel may have a dozen or more guard rails, but 3 ultrasonic bumpers or fenders would be sufficient for assisted docking purposes.

An additional alternative integration technique may include implementing ultrasonic perimeter ranging sensor assembly 610 as a terminal box housing all elements of assembly 610 except for individual transducer elements (e.g., of multichannel transducer 650 and/or individual transducers 664-666), which may instead be arranged into one or more strips of individual outward facing transducer elements electrically coupled together and distributed along a length of the strip, where the strip is configured to be attached to hull 105b of mobile structure 101 above an expected waterline level, for example, or along toe rail 106c or railings 106e, as described herein (e.g., similar to embodiments of perimeter ranging system 148b). In such embodiments, the terminal box may take the form of housing 611, which may be coupled to and/or through hull 105b and/or deck 106b, for example, with a wired interface configured to electrically couple a relatively long thin strip or strips of transducer elements through housing 611 to various elements identified within housing 611, as shown.

Figure 7:
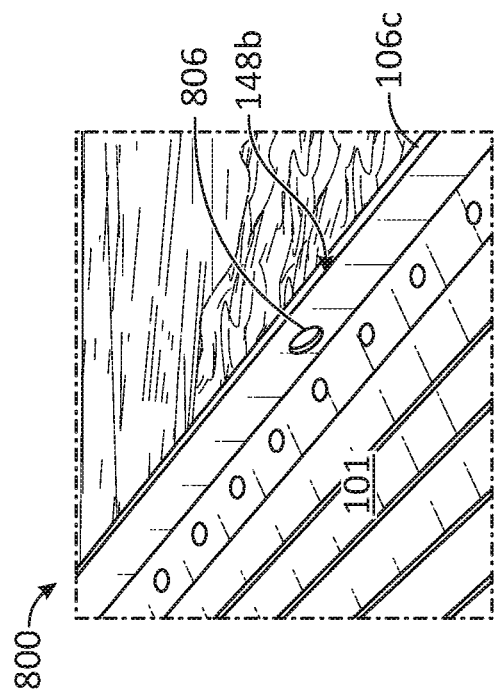
FIGS. 7-9B show diagrams illustrating integration of ultrasonic perimeter ranging sensor assemblies with a watercraft in accordance with an embodiment of the disclosure.
Figure 8:
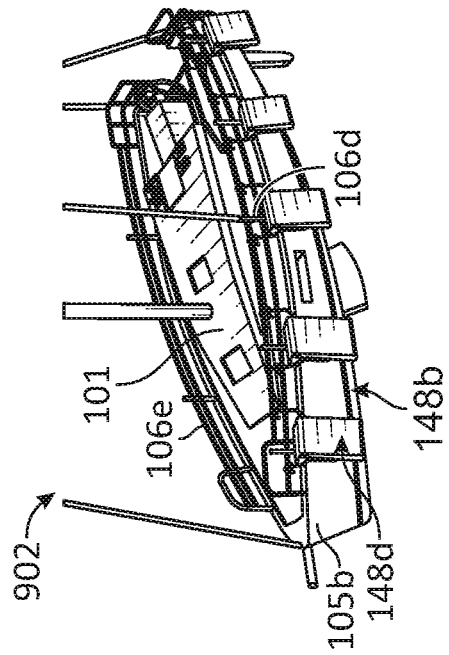

FIGS. 7-9B show diagrams 700-902 illustrating integration of embodiments of ultrasonic perimeter ranging sensor assemblies 610 (e.g., of perimeter ranging sensor system 648) with a watercraft 101 in accordance with an embodiment of the disclosure. For example, diagram 700 of FIG. 7 illustrates an embodiment of perimeter ranging system 148d where ultrasonic perimeter ranging sensor assembly 610 is coupled to or within or integrated with a bumper secured to one or more stanchions 106d and/or railings 106e of mobile structure 101. Also shown in FIG. 7 is an embodiment of perimeter ranging system 148b where ultrasonic perimeter ranging sensor assembly 610 includes a strip of individual outward facing transducer elements electrically coupled together and spaced from each other or distributed along a length of the strip, where the strip is attached to hull 105b above waterline 705b, as shown. Diagram 800 of FIG. 8 illustrates an embodiment of perimeter ranging system 148b where ultrasonic perimeter ranging sensor assembly 610 is integrated with toe rail 106c or mounted within or secured to toe rail slot 806 of mobile structure 101.

Figure 9A:
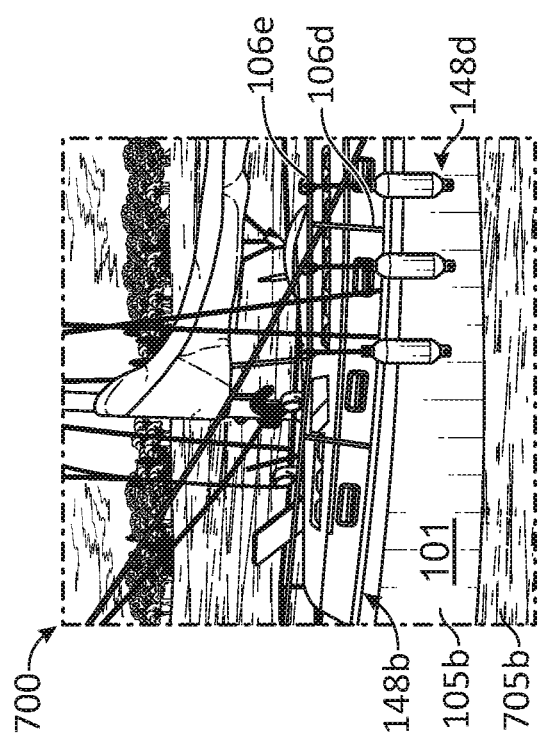
Figure 9B:
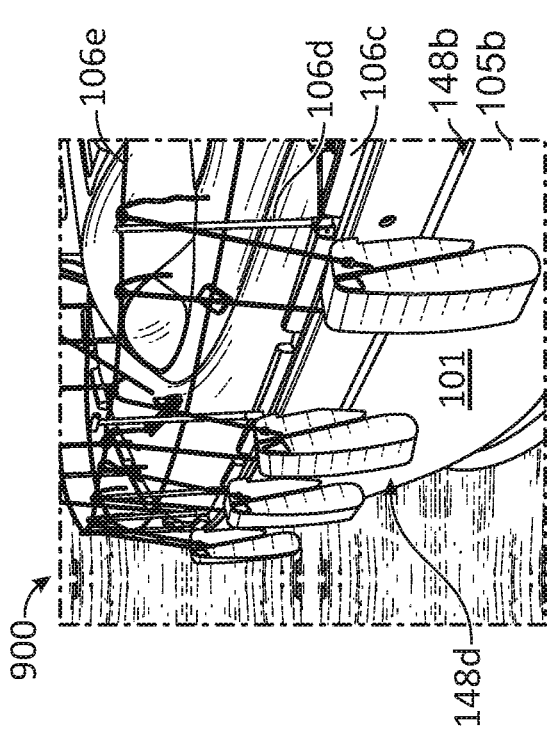

Diagram 900 of FIG. 9A illustrates an embodiment of perimeter ranging system 148d where ultrasonic perimeter ranging sensor assembly 610 is coupled to or within or integrated with a fender secured to one or more of toe rail 106c, stanchions 106d, and/or railings 106e of mobile structure 101, for example, and illustrates an embodiment of perimeter ranging system 148b where ultrasonic perimeter ranging sensor assembly 610 includes a strip of transducer elements coupled to or within or integrated with hull 105b, as shown. Diagram 902 of FIG. 9B illustrates an embodiment of perimeter ranging system 148d where ultrasonic perimeter ranging sensor assembly 610 is coupled to or within or integrated with a flat fender secured to one or more stanchions 106d of mobile structure 101, for example, and illustrates an embodiment of perimeter ranging system 148b where ultrasonic perimeter ranging sensor assembly 610 includes a strip of transducer elements coupled to or within or integrated with hull 105b, as shown. A terminal box encompassing additional elements of ultrasonic perimeter ranging sensor assembly 610 may be coupled to or within or integrated with various structural elements of watercraft 101, such as hull 105b, deck 106b, toe rail 106c, and/or transom 107b.

Figure 10:
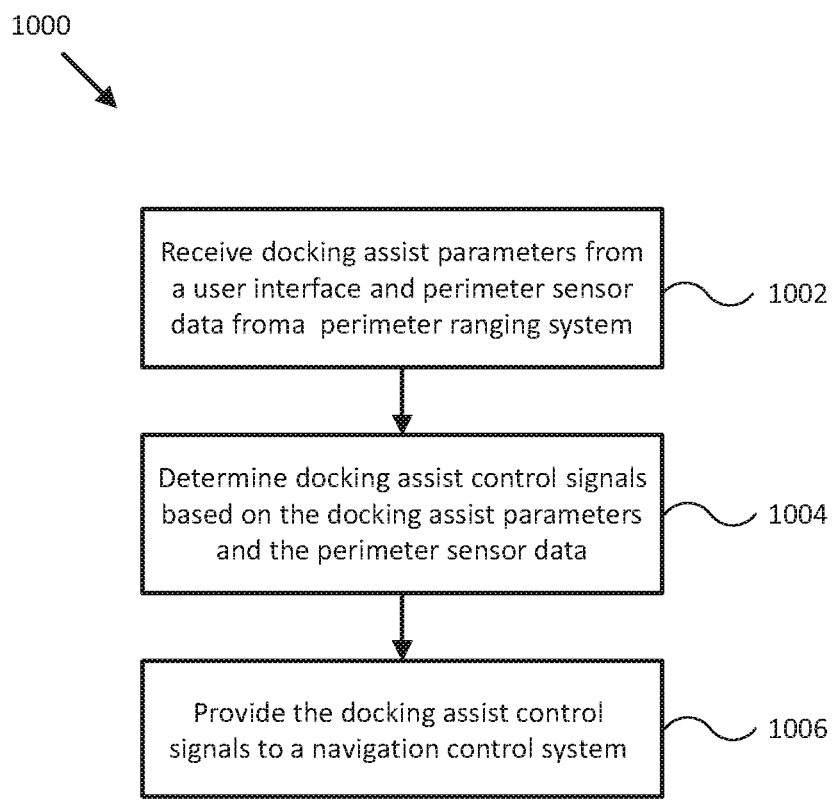
FIG. 10 illustrates a flow diagram of a process to provide docking assist for a mobile structure in accordance with an embodiment of the disclosure.

FIG. 10 illustrates a flow diagram of a process 1000 to provide docking assist for mobile structure 101 in accordance with an embodiment of the disclosure. More generally, process 1000 may be used to provide general navigational control for mobile structure 101. It should be appreciated that any step, sub-step, sub-process, or block of process 1000 may be performed in an order or arrangement different from the embodiments illustrated by FIG. 10. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1000 is described with reference to systems, processes, control loops, and images described in reference to FIGS. 1A-9B, process 1000 may be performed by other systems different from those systems, processes, control loops, and images and including a different selection of electronic devices, sensors, assemblies, mobile structures, and/or mobile structure attributes, for example.

In block 1002, docking assist parameters are received from a user interface and perimeter sensor data is received from a perimeter ranging system. For example, controller 130 may be configured to receive docking assist parameters from user interface 120 and perimeter sensor data from perimeter ranging system 148.

In some embodiments, the docking assist parameters may include user pilot control signals, such as user input provided to user interface 120 for direct navigational control of mobile structure 101. Such user input may include linear and/or rotational joystick user input, a dead stick user input, and/or other direct user input to user interface 120. In other embodiments, the docking assist parameters may include a target docking position and/or orientation for mobile structure 101. For example, controller 130 may be configured to generate a view of a docking area for mobile structure 101 on a display of user interface 120 and receive user input from user interface 120 indicating a target docking track and/or a target docking position and/or orientation within the generated view of the docking area.

In block 1004, docking assist control signals are determined based on docking assist parameters and perimeter sensor data. For example, controller 130 may be configured to determine one or more docking assist and/or navigation control signals based, at least in part, on the docking assist parameters and the perimeter sensor data received in block 1002.

In some embodiments, where the docking assist parameters received in block 1002 include user pilot control signals, controller 130 may be configured to determine a target linear and/or angular velocity for mobile structure 101 based, at least in part, on the user pilot control signals and a maximum maneuvering thrust of the navigation control system. Controller 130 may be configured to then determine the one or more docking assist control signals based, at least in part, on the determined target linear and/or angular velocity, where the one or more docking assist control signals are configured to cause navigation control system 190 to maneuver mobile structure 101 according to the determined target linear and/or angular velocity. In related embodiments, the user pilot control signals may correspond to a dead stick user input, as described herein, and the target linear and/or angular velocity for mobile structure 101 may be set to zero.

In other embodiments, where the docking assist parameters received in block 1002 include a target docking position and/or orientation for mobile structure 101, controller 130 may be configured to determine a target docking track for the mobile structure based, at least in part, on the target docking position and/or orientation and one or more docking safety parameters corresponding to the target docking track. In further embodiments, the docking assist parameters received in block 1002 may themselves include a target docking track. In either embodiment, controller 130 may be configured to then determine the one or more docking assist control signals based, at least in part, on the determined or received target docking track, where the one or more docking assist control signals are configured to cause navigation control system 190 to maneuver mobile structure 101 according to the determined or received target docking track.

In additional embodiments, controller 130 may be configured to determine a range to a navigation hazard disposed within a monitoring perimeter of the perimeter ranging system based, at least in part, on the received perimeter sensor data, determine the range to the navigation hazard is within a safety perimeter for the mobile structure, and/or determine the one or more docking assist control signals based, at least in part, on the determined range to the navigation hazard, wherein the one or more docking assist control signals are configured to cause navigation control system 190 to maneuver mobile structure 101 to evade the navigation hazard by maintaining or increasing the range to the navigation hazard.

In further embodiments, controller 130 may be configured to determine a relative velocity of a navigation hazard disposed within a monitoring perimeter of perimeter ranging system 148 based, at least in part, on the received perimeter sensor data, to determine the relative velocity of the navigation hazard towards mobile structure 101 is greater than a hazard velocity limit, and determine the one or more docking assist control signals based, at least in part, on the determined relative velocity of the navigation hazard, wherein the one or more docking assist control signals are configured to cause navigation control system 190 to maneuver mobile structure 101 to evade the navigation hazard by decreasing the relative velocity of the navigation hazard towards mobile structure 101.

Controller 130 may also be configured to determine wind and/or water current disturbances affecting navigation of mobile structure 101 and to determine the one or more docking assist control signals based, at least in part, on the determined wind and/or water current disturbances, wherein the one or more docking assist control signals are configured to cause navigation control system 190 to compensate for the determined wind and/or water current disturbances while maneuvering mobile structure 101 according to the received docking assist parameters.

In block 1006, docking assist control signals are provided to a navigation control system. For example, controller 130 may be configured to provide the one or more docking assist and/or navigation control signals determined in block 1004 to navigation control system 190. In some embodiments, navigation control system 190 may include one or more of steering actuator 150, propulsion system 170, and thrust maneuver system 172, and providing the docking assist control signal to navigation control system 190 may include controlling steering actuator 150, propulsion system 170, and/or thrust maneuver system 172 to maneuver mobile structure 101 according to a target linear and/or angular velocity or a target docking position and/or orientation corresponding to docking assist parameters received in block 1004.

For example, controller 130 may be configured to control steering actuator 150, propulsion system 170, and/or thrust maneuver system 172 of mobile structure 101 to generate a target linear and/or angular velocity for mobile structure 101 identified in the docking assist parameters provided in block 1004. If the target linear and/or angular velocity is zero (e.g., corresponding to a dead stick user input), then the docking assist control signals may be configured to counteract any detected motion of mobile structure 101, including motion caused by various external disturbances, as described herein. In another example, controller 130 may be configured to control steering actuator 150, propulsion system 170, and/or thrust maneuver system 172 of mobile structure 101 to follow a target docking track to a target docking position and/or orientation identified in the docking assist parameters provided in block 1004.

In some embodiments, controller 130 may be configured to provide docking assist control signals configured to evade a navigation hazard detected by perimeter ranging system 190 by maintaining or increasing a range to the navigation hazard and/or by decreasing the relative velocity of the navigation hazard towards mobile structure 101. In such embodiments, the docking assist control signals may be configured to minimize deviation from the target linear and/or angular velocity, or to minimize deviation from the target docking track, while evading the navigation hazard.

Embodiments of the present disclosure can thus provide reliable and accurate docking assist for mobile structures. Such embodiments may be used to provide assisted and/or fully autonomous docking and/or navigation of a mobile structure and may assist in the operation of other systems, devices, and/or sensors coupled to or associated with the mobile structure, as described herein.

Figure 11:
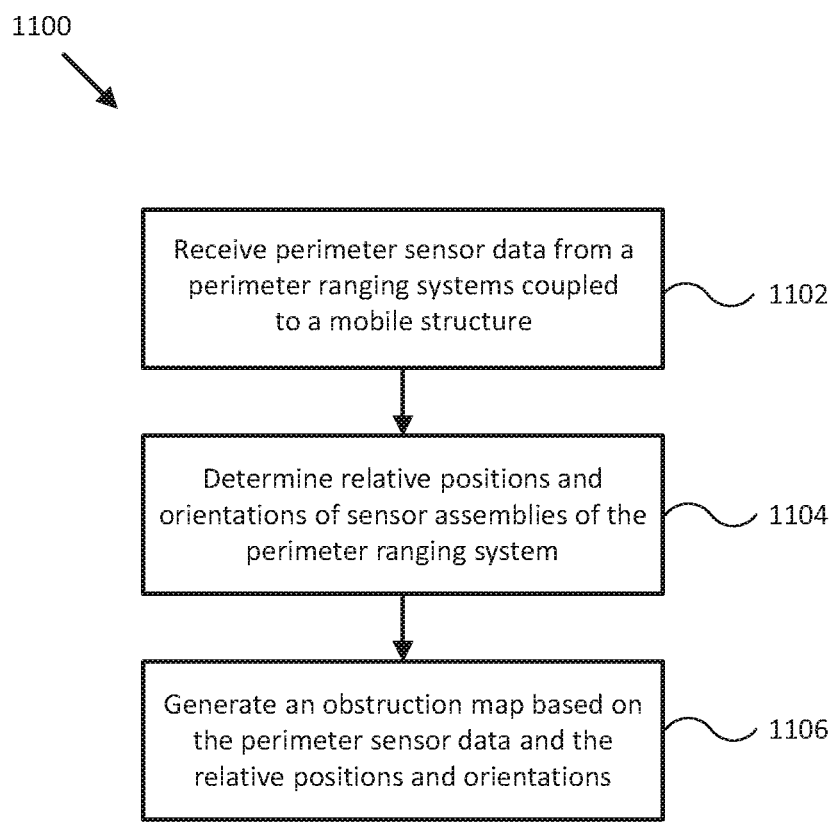
FIG. 11 illustrates a flow diagram of a process to operate a perimeter ranging system for a mobile structure in accordance with an embodiment of the disclosure.

FIG. 11 illustrates a flow diagram of a process to operate a perimeter ranging system for a mobile structure in accordance with an embodiment of the disclosure. More generally, process 1100 may be used to operate and calibrate a perimeter ranging system coupled to mobile structure 101. It should be appreciated that any step, sub-step, sub-process, or block of process 1100 may be performed in an order or arrangement different from the embodiments illustrated by FIG. 11. For example, in other embodiments, one or more blocks may be omitted from or added to the process. Furthermore, block inputs, block outputs, various sensor signals, sensor information, calibration parameters, and/or other operational parameters may be stored to one or more memories prior to moving to a following portion of a corresponding process. Although process 1100 is described with reference to systems, processes, control loops, and images described in reference to FIGS. 1A-9B, process 1100 may be performed by other systems different from those systems, processes, control loops, and images and including a different selection of electronic devices, sensors, assemblies, mobile structures, and/or mobile structure attributes, for example.

In block 1102, perimeter sensor data is received from a perimeter ranging system. For example, controller 130 may be configured to receive perimeter sensor data from one or more ultrasonic perimeter ranging sensor assemblies 648 of perimeter ranging system 148. In some embodiments, one or more of ultrasonic perimeter ranging sensor assemblies 648 may be fixedly or permanently mounted to mobile structure 101, for example, such as bonded to or within toe rail 106c or stanchion 106d. In other embodiments, one or more of ultrasonic perimeter ranging sensor assemblies 648 may be releasably secured or strapped to toe rail 106c or stanchion 106d, for example, or integrated with a fender or bumper that is itself releasably secured to toe rail 106c, stanchion 106d, and/or railing 106e.

In some embodiments, each ultrasonic perimeter ranging sensor assembly 610 may be implemented with communications module 670 and controller 130 may be configured to receive perimeter sensor data wirelessly. In related embodiments, each ultrasonic perimeter ranging sensor assembly 610 may be configured to provide perimeter sensor data, timing parameters, frequency modulation parameters, and/or other data or parameters to adjacent ultrasonic perimeter ranging sensor assemblies 648 via communications module 670, for example, and/or via modulation of an ultrasonic emission of an ultrasonic transducer of each ultrasonic perimeter ranging sensor assembly 610. For example, one ultrasonic perimeter ranging sensor assembly 610 may provide its ranging emission modulation characteristics, time of emission, and/or other operating characteristics or parameters to an adjacent ultrasonic perimeter ranging sensor assembly 610 via a data communication emission modulation receivable by the adjacent ultrasonic perimeter ranging sensor assembly 610, and the adjacent ultrasonic perimeter ranging sensor assembly 610 may be configured to adjust its own ranging emission characteristics to reduce interference in the operation of perimeter ranging system 148, without requiring indirect negotiation through controller 130.

In additional embodiments, each ultrasonic perimeter ranging sensor assembly 610 may be implemented with a visible spectrum or thermal camera oriented to aim along an emission axis associated with ultrasonic perimeter ranging sensor assembly 610 (e.g., normal to emission surface 612). In such embodiments, reception of the perimeter sensor data included reception of the visible spectrum and/or thermal image data.

In block 1104, relative positions and/or orientations of ultrasonic perimeter ranging sensor assemblies are determined. For example, controller 130 may be configured to determine relative positions and/or orientations of one or more ultrasonic perimeter ranging sensor assemblies 648 of perimeter ranging system 148 based on the perimeter sensor data received in block 1102. In some embodiments, controller 130 may be configured to identify common structures represented in perimeter sensor data provided by adjacent ultrasonic perimeter ranging sensor assemblies 648, such as by correlated detected motion over time, similar detected height, width, or silhouette characteristics, and/or other similar structure characteristics detectable by embodiments of ultrasonic perimeter ranging sensor assemblies 648. Controller 130 may be configured to determine a relative orientation and/or position of the adjacent ultrasonic perimeter ranging sensor assemblies 648, relative to each other, based on the identified common structures represented in the perimeter sensor data.

In another embodiment, controller 130 may be configured to determine relative orientations and/or positions of ultrasonic perimeter ranging sensor assemblies 648 coupled to mobile structure 101 by receiving, as user input provided to user interface 120, estimated orientations and/or positions of ultrasonic perimeter ranging sensor assemblies 648, and then refining the relative orientation, position, or both based, at least in part, on the perimeter sensor data received in block 1102. In a further embodiment, controller 130 may be configured to determine relative orientations and/or positions of ultrasonic perimeter ranging sensor assemblies 648, relative to a perimeter of mobile structure 101, based, at least in part, on the perimeter sensor data received in block 1102.

More generally, controller 130 may be configured to accept user input selecting relative orientations and/or positions of ultrasonic perimeter ranging sensor assemblies 648, relative to a perimeter of mobile structure 101 and/or relative to each other. In one embodiment, controller 130 may be configured to identify a portion of mobile structure 101 represented in perimeter sensor data from one ultrasonic perimeter ranging sensor assembly 610 and determine the relative orientation and/or position of the one ultrasonic perimeter ranging sensor assembly 610 based on the identified portion of mobile structure 101 represented in the perimeter sensor data. In various embodiments, each of such determination techniques may be combined and/or implemented as a control loop such that the relative orientations and/or positions are refined over time as mobile structure passes various navigation hazards with detectable characteristics and as each ultrasonic perimeter ranging sensor assembly 610 accumulates perimeter sensor data associated with it monitoring area.

In block 1106, an obstruction map is generated. For example, controller 130 may be configured to generate an obstruction map (e.g., including representations of various navigation hazards) based, at least in part, on the perimeter sensor data received in block 1102 and the relative orientations and/or positions of the one or more ultrasonic perimeter ranging sensor assemblies 648 of perimeter ranging system 148 as determined in block 1104. Such map may be rendered for display to a pilot of mobile structure 101, for example, or may be used by system 100 to determine one or more docking assist control signals to dock and/or otherwise navigate mobile structure 101. In some embodiments, such obstruction map may include perimeter sensor data from multiple ultrasonic perimeter ranging sensor assemblies 648 that is aggregated to form a two or three-dimensional plot of navigation hazards proximate to mobile structure 101. In further embodiments, controller 130 may be configured to generate three dimensional renderings, from the viewpoints of the various ultrasonic perimeter ranging sensor assemblies 648 of perimeter ranging system 140 and present them as views from different perspectives about a perimeter of mobile structure 101.

Embodiments of the present disclosure can thus provide reliable and accurate operation and/or calibration of perimeter ranging systems for mobile structures. Such embodiments may be used to provide assisted and/or fully autonomous docking and/or navigation of a mobile structure and may assist in the operation of other systems, devices, and/or sensors coupled to or associated with the mobile structure, as described herein.

Figure 12:
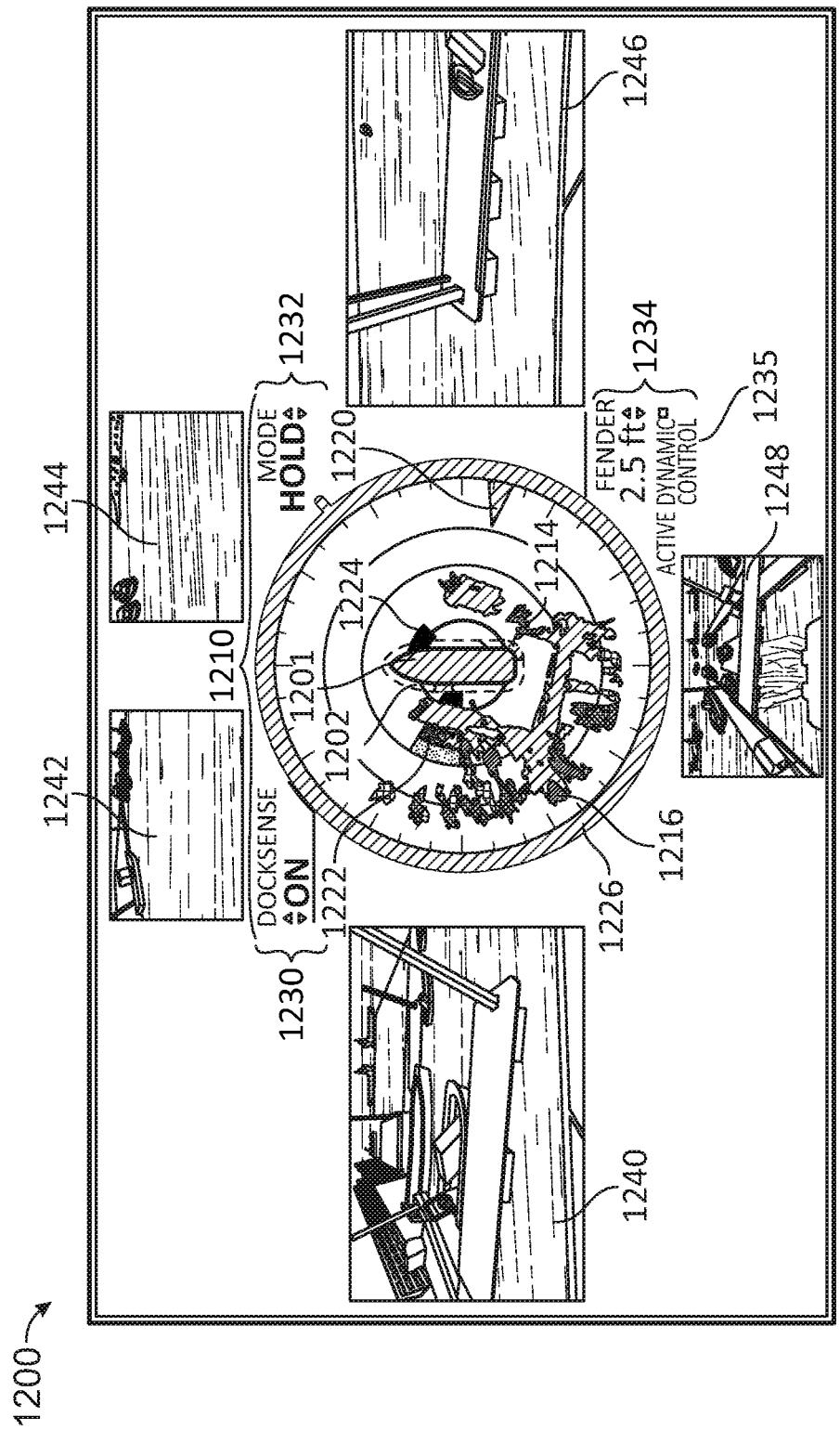
FIGS. 12-13 show display views for a docking assist system in accordance with an embodiment of the disclosure.
Figure 13:
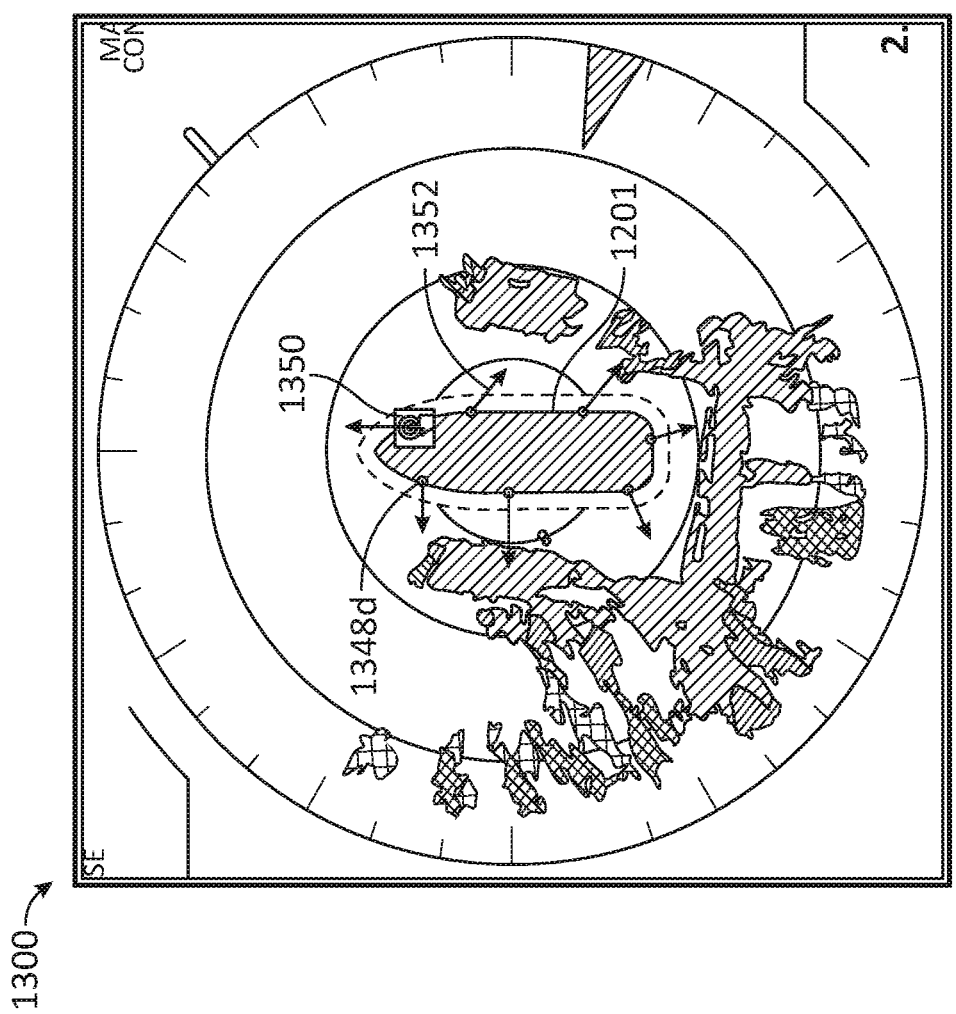

FIGS. 12-13 illustrate various display views 1200-1300 of a docking user interface in accordance with an embodiment of the disclosure. In various embodiments, each display view of FIGS. 12-13 may be generated using process 1000 or 1100 to provide a docking user interface for mobile structure 101, as described herein. In general, display views 1200-1300 include a selection of display elements configured to help a user of system 100 intuitively recognize a safety and/or operational status of mobile structure 101. For example, FIG. 12 shows display view 1200 corresponding to a docking assist navigation mode for system 100. As shown in FIG. 12, display view 1200 includes maneuvering guide 1210 disposed between port video 1240 and starboard video feed 1246, and between bow video feeds 1242 and 1244 and stern video feed 1248. Each of the individual video feeds may be arranged within display view 1200 about maneuvering guide 1210 generally according to the mounting position on mobile structure 101 of the camera providing the video feed, relative to the orientation of mobile structure perimeter indicator 1201 (e.g., depicted in display view 1200 in a heading-up orientation). Such arrangement may be referred to as a geospatial video feed arrangement about maneuvering guide 1210. In various embodiments, the number and positioning of video feeds within such arrangement may depend on the number of cameras used and their location about mobile structure 101.

In the embodiment shown in FIG. 12, port video feed 1240 may be provided by a camera mounted along a port side of mobile structure 101 and aimed substantially to port, bow video feeds 1242 and 1244 may be provided by cameras mounted near a bow of mobile structure 101 (e.g., possibly to port and/or starboard of a bow of mobile structure 101) and aimed substantially along a longitudinal axis of mobile structure 101, starboard video feed 1246 may be provided by a camera mounted along a starboard side of mobile structure 101 and aimed substantially to starboard, and rear or stern video feed 1248 may be provided by a camera mounted near a stern of mobile structure 101 and aimed substantially antiparallel to a longitudinal axis of mobile structure 101. In alternative embodiments, one or more of such video feeds may be replaced by three dimensional renderings of a monitoring area associated with a correspondingly placed perimeter ranging sensor assembly, as described herein.

In FIG. 12, maneuvering guide 1210 includes mobile structure perimeter indicator 1201 configured to indicate a perimeter of mobile structure 101, obstruction map 1216 showing various navigation hazards detected by perimeter ranging system 148, an external disturbance indicator 1220 configured to indicate a direction and magnitude of an aggregate external disturbance, and translational and rotational thrust indicators 1222 and 1224 each rendered according to a color render palette (e.g., while system 100 is in a docking assist navigation mode, as indicated by docking assist indicator/selector 1232). In the embodiment shown in FIG. 12, such color palette maps larger magnitude thrusts to less translucent/more saturated colors.

Translational thrust indicator 1222 may be implemented as a segmented cone-shaped bar graph configured to indicate a translational maneuvering thrust magnitude (e.g., corresponding to a radial length of translational thrust indicator 1222) and direction (e.g., corresponding to a radial direction of translational thrust indicator 1222) relative to the orientation of mobile structure perimeter indicator 1201 shown in maneuvering guide 1210. Rotational thrust indicator 1224 may be implemented as an arc-shaped semicircular bar graph configured to indicate a rotational maneuvering thrust magnitude (e.g., corresponding to an arc length of rotational thrust indicator 1224) and direction (e.g., clockwise or counterclockwise corresponding to the respective right or left disposition of rotational thrust indicator 1224) relative to the orientation of mobile structure perimeter indicator 1201 shown in maneuvering guide 1210. Although shown in display view 1200 as rendered beneath obstruction map 1216 (e.g., to ensure navigation hazards are viewable within maneuvering guide 1210), in other embodiments, translational and/or rotational thrust indicators 1222, 1224 may be rendered on top of obstruction map 1216 (e.g., to emphasize maneuvering situational awareness, or thrusts approaching maximum available thrust) and/or be rendered at least partially translucent relative to obstruction map 1216.

In particular, as shown in the embodiment shown in FIG. 12, rotational thrust indicator 1224 may be implemented as arc-shaped semicircular bar graph centered to mobile structure perimeter indicator 1201 and rendered with a diameter less than a length of mobile structure perimeter indicator 1201 and greater than half the length of mobile structure perimeter indicator 1201. To help visually quantify the magnitudes indicated by rotational thrust indicator 1224, maneuvering guide 1210 may include a set of rotational thrust scale markers implemented as two pluralities (e.g., left and right) of radially oriented line segments each distributed evenly across half a circumference of an outer circle of translational thrust scale markers of maneuvering guide 1210, where each line segment corresponds to a particular rotational thrust percentage of a maximum available rotational thrust generated by navigation control system 190 (e.g., zero clockwise/counterclockwise thrust is at 0 degrees, and maximum clockwise/counterclockwise thrust is at 180 degrees), for example, or where each line segment corresponds to a particular absolute measure of rotational thrust (e.g., in units of force or torque).

In various embodiments, as shown in display view 1200, a docking user interface may include various other indicators and/or buttons, selectors, or other controls. For example, maneuvering guide 1210 of display view 1200 includes a perimeter ranging sensor indicator/selector 1230 (e.g., allowing a pilot to enable or disable perimeter ranging system 148 and/or elements thereof), a docking assist indicator/selector 1232 (e.g., allowing a pilot to enable or disable a docking assist navigation mode or select a hold, drift, or manual navigation mode for system 100 and/or select between a manual navigation mode and a docking assist navigation mode), and a virtual bumper perimeter thickness indicator/selector 1234 (e.g., which may be configured to enable, disable, indicate, and/or provide for user selection of a thickness of a virtual bumper about mobile structure 101 corresponding to a virtual bumper perimeter indicator 1202 disposed about mobile structure perimeter indicator 1201.

In some embodiments, virtual bumper perimeter thickness indicator/selector 1234 may include an additional navigation assist indicator 1235 (e.g., a textual and/or graphical indicator) configured to indicate system 100 is providing navigation assist (e.g., docking assist and/or other navigation assist where system 100 is actively moderating a raw thrust demand in response to detected navigation hazards, such as in obstacle map 1216) for mobile structure 100. In various embodiments, maneuvering guide 1210 may include an additional navigation assist indicator 1226 (e.g., a graphical indicator) configured to indicate system 100 is providing navigation assist (e.g., docking assist) for mobile structure 100. In the embodiment shown in FIG. 12, navigation assist indicator 1226 is implemented as a blue color and variable graphic density or diffuse halo applied to an outer circle of translational thrust scale markers of maneuvering guide 1210. For example, such variable graphic density halo may be configured to highlight an operational state of system 100 and may be implemented with a uniform thickness and a relatively high graphic density at such outer circle (e.g., and features of such circle) that decreases to zero graphic density within the bounds of maneuvering guide 1210.

In further embodiments, system 100 may be configured to render one or more virtual bumper perimeter intrusion indicators 1214 disposed substantially within a virtual bumper perimeter indicator of mobile structure perimeter indicator 1201, where virtual bumper perimeter intrusion indicators 1214 may be configured to indicate relative positions of navigation hazards disposed within a monitoring perimeter of perimeter ranging system 148 of mobile structure 101 and detected at or within the thickness of virtual bumper perimeter indicator 1202 of mobile structure perimeter indicator 1201. Such navigation hazard may be at least partially represented in obstruction map 1216. In various embodiments, each virtual bumper perimeter intrusion indicator 1214 may be implemented by a graphics texture with a shape generally matching that of the intruding navigation hazard and including a color and/or pattern different than that used to render virtual bumper perimeter indicator 1202 of mobile structure perimeter indicator 1201. In some embodiments, virtual bumper perimeter intrusion indicator 1214 may be animated and/or flashing to draw attention of a user. In further embodiments, such navigation hazard may be identified and visually highlighted in a corresponding video feed (e.g., port video feed 1240), such as by an overlay similar in color, pattern, shape, and/or translucency to virtual bumper perimeter intrusion indicator.

FIG. 13 shows display view 1300 corresponding to a perimeter ranging sensor assembly placement and/or calibration mode for system 100. As shown in FIG. 13, display view 1300 includes many of the same graphics rendered within display view 1200, but shows estimated positions and orientations of various ultrasonic perimeter ranging sensor assemblies 648 using sensor assembly position indicators 1348*d* and sensor assembly orientation indicators 1352. In various embodiments, system 100 may be configured to determine such orientations and/or positions (e.g., relative to each other and/or a perimeter of mobile structure 101 indicated by mobile structure perimeter indicator 1201). For example, user interface 120 may be configured to receive user input manipulating orientation and/or position selector 1350 to select or adjust a relative position of a sensor assembly position indicator 1348*d* or a relative orientation of a sensor assembly orientation indicator 1352 corresponding to one ultrasonic perimeter ranging sensor assembly 610 of perimeter ranging system 148. In another embodiment, such user input may select a particular ultrasonic perimeter ranging sensor assembly 610 to indicate that system 100 should attempt to determine its relative orientation and position (e.g., relative to a perimeter of mobile structure 101) based, at least in part, on perimeter sensor data.

As noted herein, embodiments of the perimeter ranging system 148 may include a distributed set of ranging sensors, such as ultrasonic sensors, which can be retrofitted to a watercraft without requiring holes to be drilled in its hull. Ranging systems including ultrasonic sensors may be used to measure distances in many different applications. For watercraft, cutting a series of holes in a hull every 0.5 m just above the waterline presents a variety of problems. Furthermore, timescales are longer in boat docking (no brake pedal, as in a terrestrial vehicle, and it takes time to slow a boat to a stop), so it is desirable to range out to 6 m or more during typical navigation maneuvers, including docking. Embodiments of assembly 610 may include a self-adhesive possibly decorative strip containing ranging sensors, which may be arranged in a relatively short baseline of ranging sensor, such as a steerable array of ultrasonic transducers, as described herein.

Embodiments described herein may be implemented as a perimeter ranging system for a watercraft that reports the proximity of surrounding objects and structures. Such systems can be used to support any maneuvering activity, including docking or navigation, and can be used to detect and avoid stationary or nonstationary navigation hazards, such as oncoming watercraft. In various embodiments, a perimeter ranging system includes multiple ranging sensors, such as ultrasonic sensors/transducers, that are distributed about the watercraft. In some embodiments, the ultrasonic transducers are physically wired together, and in other embodiments, such sensors are communicatively coupled wirelessly. Such perimeter ranging systems can be used in conjunction with other perimeter ranging systems and/or other sensors, including visible spectrum and/or thermal cameras, to enhance performance of the system.

Ultrasonic sensors/transducers may be arranged according to a wide variety of operational applications. For example, one such arrangement is mono-static, where each transducer element acts as both a transmitter and receiver. In such arrangements, typically only range information is available because there is no physical separation between transmitter and receiver. Another ultrasonic sensor arrangement is bi-static, where receiver transducer elements are physically differentiated from transmitter transducer elements. In such arrangements, typically some directional information is available due to the physical separation of the elements. Another ultrasonic sensor arrangement is single-transmitter, multi-receiver or multi-static, where one transducer element transmits and surrounding transducer elements receive reflections of the transmitted signal. In such arrangements, significant directional information is available because of the multilocation of the receivers, and such directional information may be used to reduce false targets and incorrect directional information e.g. unwanted signals from side lobes, as described herein. Another ultrasonic sensor arrangement is multiplexing, where a set of transducer elements (e.g., transmitters and receivers) are multiplexed to a smaller set of electronics (e.g., other elements of assembly 610) so that the amount of electronics, and therefore the overall cost of the system, can be reduced, though with some disadvantages associated with the update rate and the capability to use bi-static or multi-static techniques, as described herein. Each of such arrangements are also described with reference to ultrasonic perimeter ranging sensor system 648 of FIG. 6

In various embodiments, ultrasonic perimeter ranging sensor system 648 may be configured to operate in a manner to minimize interference between elements but maximize overall update rate, so as to maintain situational awareness about watercraft 101. For example, if adjacent elements operate simultaneously then the transmissions from one element could interfere with the other. For a multi-element system, if each element were to be operated in succession then the update rate of the full 360 surrounding environment would be prohibitive for maneuvering. An orchestration of the elements may be used to avoid interference while maximizing update rates. One such orchestration is to operate widely spaced elements, such that the distance ensures that interference returns are not received, which can significantly improve the overall update rate, and which may support multi-static processing, as described herein.

In some embodiments, ultrasonic perimeter ranging sensor system 648 may be configured to provide vertical discrimination to better identify navigation hazards about watercraft 101. It can be critical to be able to discriminate a water surface from objects or structure for autonomous or assisted maneuvering, a process that is otherwise difficult for other types of sensors and sensor systems. It can also be important to be able to define the vertical profile of nearby structures and objects in order to detect protrusions that could collide with hull 105*b* or transom 107*b*. To achieve vertical discrimination with a perimeter ranging system, typically more than one sensor element is needed to be offset in the vertical plane. This may be achieved either through a second strip of elements, disposed above or below a first strip (e.g., at a known and/or roughly homogenous or constant vertical distance between strips), or by including a second element (or more) within the strip that is disposed above or below the remaining elements of the strip. Measurement of the time difference or phase of arrivals between the elements indicates the vertical features of structure or objects. In related embodiments, ultrasonic perimeter ranging sensor system assembly 610 may be implemented as a single point installation with a 2D or 3D capable arrangement of transducer elements, such as an array of ultrasonic sensors mounted above decks to create an 2D/3D scanner which may be an independent sensor or combined with one or more visible spectrum and/or infrared imaging modules/cameras. A scene may be interrogated for range information, which may then be used according to any of the techniques described herein. Multiple instances of such installations may be used around watercraft 101, where the perimeter ranging data from each installation may be combined to provide an all-around view of the surrounding objects and structures, as described in various forms herein.

In alternative or supplemental embodiments, surrounding (and generally fixed) structures that present a typical navigation hazard may be augmented or fitted with active responders to help refine their relative positioning. For example, one of the difficulties with using ranging systems on a vehicle is coping with the constant motion of the platform. If transducer elements and/or entire ultrasonic perimeter ranging sensor systems are fitted to surrounding structures, such as docks, slips, buoys, and/or other fixed or semi-fixed structures, then the self-movement of watercraft 101 can be removed from the processing. For example, such systems may transmit remote perimeter ranging data to ultrasonic perimeter ranging sensor system 648, and the remote perimeter ranging data will be free of platform motion. Alternatively, if transducer elements are coupled to the surrounding structure and actively transmit in a way that is received by ultrasonic perimeter ranging sensor system 648, then the resulting perimeter ranging data will be less susceptible to any perturbations caused by platform motion between the transmission and receipt at watercraft 101 of such beams (e.g., as opposed to round trip transmissions and corresponding platform motion).

Figure 14:
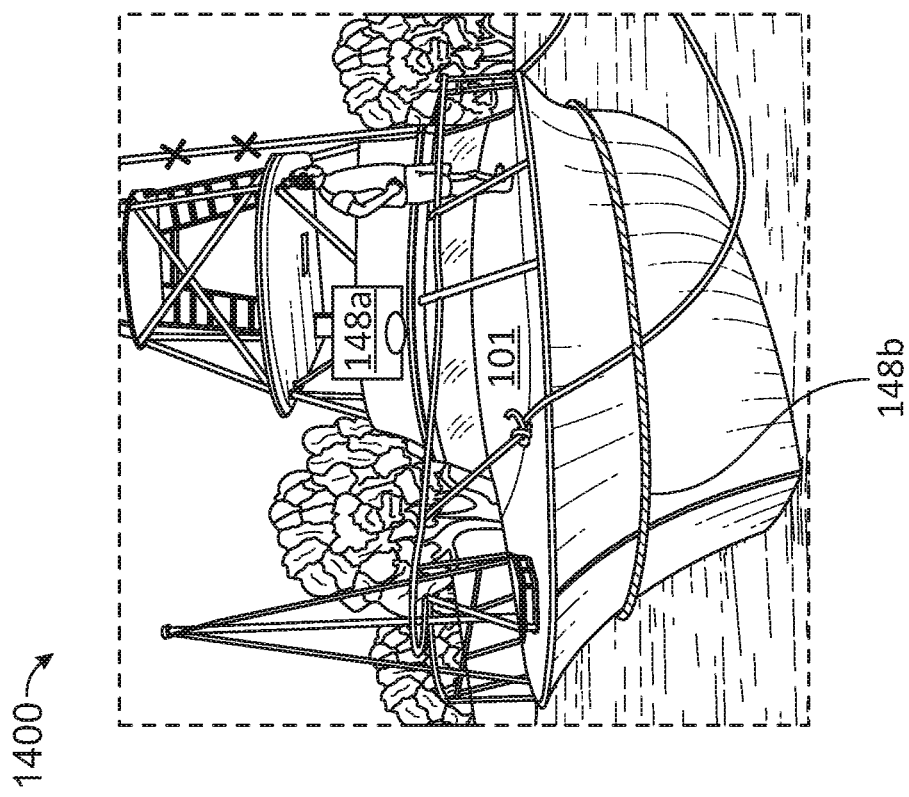
FIG. 14 shows a diagram illustrating integration of ultrasonic perimeter ranging sensor systems with a watercraft in accordance with an embodiment of the disclosure.
Figure 14:
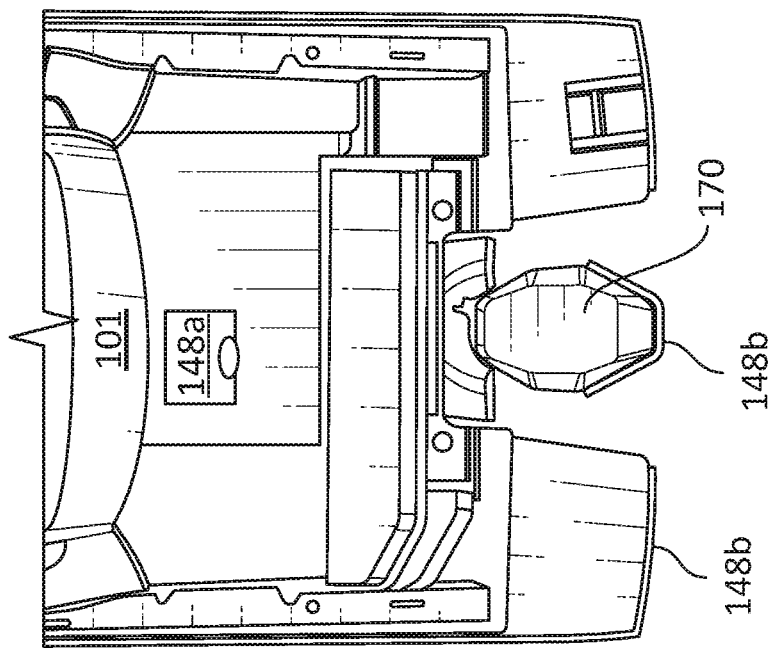

FIG. 14 shows a diagram 1400 illustrating integration of ultrasonic perimeter ranging sensor systems 148*a* and 148*b* with watercraft 101 in accordance with an embodiment of the disclosure. In particular, diagram 1400 shows an embodiment of ultrasonic perimeter ranging sensor system assembly 610 implemented as a single point installation embodiment of perimeter ranging system 148*a* with 2D and/or 3D capabilities, as described herein, that is coupled to a portion of watercraft 101 that is above deck 106*b* and/or substantially above railings 106*e*. For example, perimeter ranging systems 148*a* may be implemented according to perimeter ranging system assembly 1610 shown in FIG. 16. In addition, diagram 1400 shows an embodiment of ultrasonic perimeter ranging sensor system assembly 610 implemented as a strip of transducer elements embodiment of perimeter ranging system 148*b* coupled and/or otherwise adhered to a hull of watercraft 101 above a corresponding waterline of watercraft 101, as described herein. Such transducer element strip can surround the vessel completely, can protect the aft of the boat, or can be part of an outboard motor or any combination of these. For example, in some embodiments, perimeter ranging system 148*b* may be affixed to watercraft 101 around hull 105*b*, transom 107*b*, and to portions of propulsion system 170 (e.g., an outboard motor), as shown.

Figure 15:
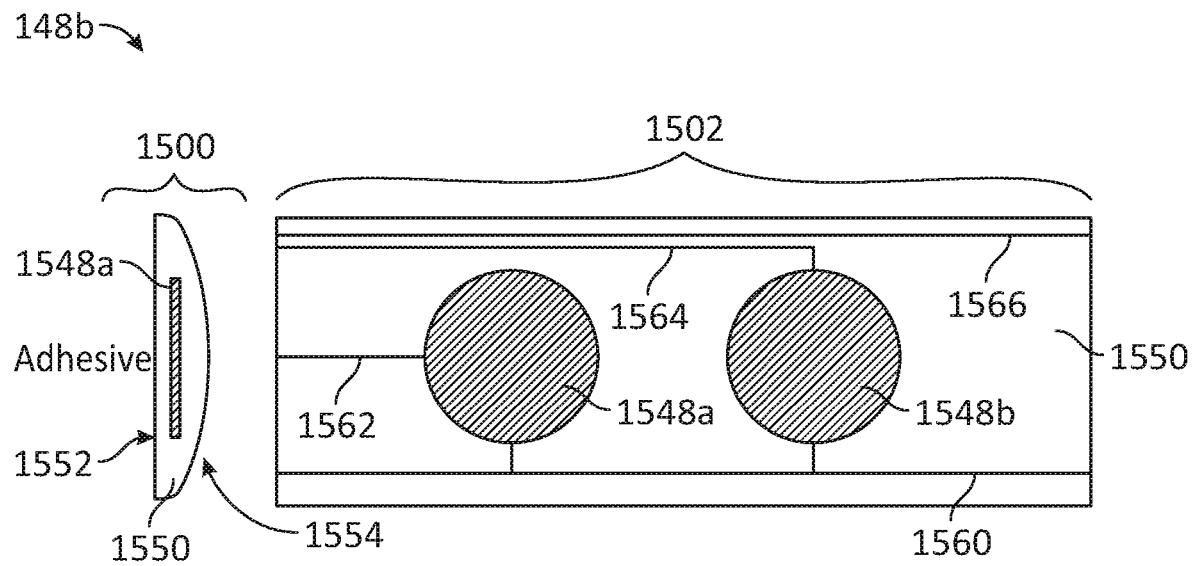
FIGS. 15-16 show diagrams of ultrasonic perimeter ranging system assemblies of an ultrasonic perimeter ranging system for a docking assist system in accordance with embodiments of the disclosure.
Figure 16:
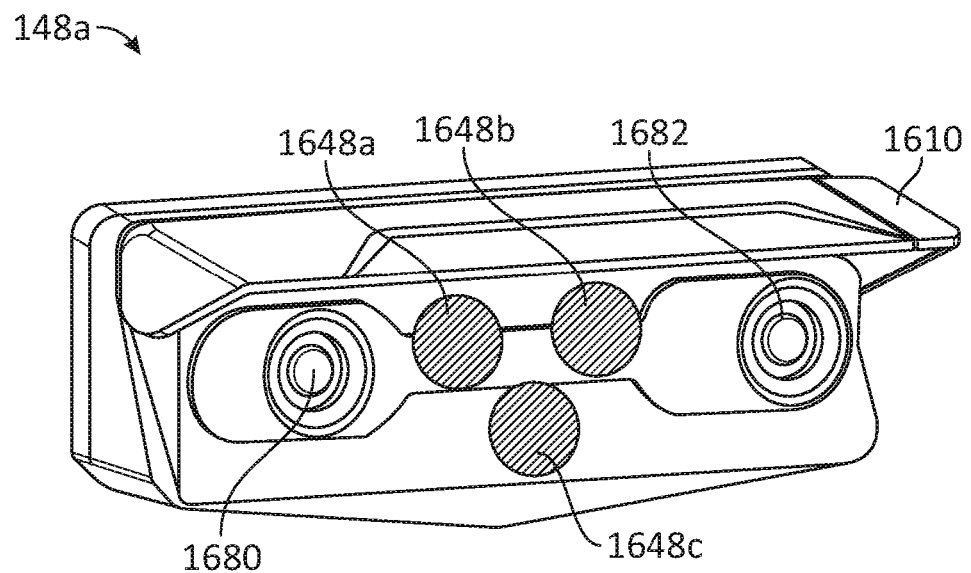

FIGS. 15-16 show diagrams of ultrasonic perimeter ranging system assemblies of ultrasonic perimeter ranging systems 148*a* and 148*b* of FIG. 14, as used for a docking assist system 100 in accordance with embodiments of the disclosure. For example, in FIG. 15, perimeter ranging system 148*b* includes two or more ultrasonic transducer elements 1548*a,b* embedded within a strip substrate 1550 such that each ultrasonic transducer element is displaced from an adjacent ultrasonic transducer element along a length of the strip. A cross section 1500 of perimeter ranging system 148*b* shows a side view of ultrasonic transducer element 1548*a* embedded substantially within strip substrate 1550, where strip substrate 1550 includes a substantially flat inner surface 1552 configured to adhere to hull 105*b* and a substantially convex or convex-shaped outer surface 1554 configured to protect ultrasonic transducer elements 1548*a,b* and/or hull 105*b* from damage caused by accidental contact with navigation hazards. In various embodiments, inner surface 1552 may include an adhesive that affixes perimeter ranging system 148*b* to hull 105*b* and/or other structural elements of watercraft 101. In other embodiments, perimeter ranging system 148*b* may be attached through physical ties such as screws. Such tape strip embodiment of perimeter ranging system 148*b* may include multiple ultrasonic transducer elements 1548 where electrical connections are brought along the strip to terminate at a connector that is in turn coupled to watercraft 101. Multiple such strips can be attached to watercraft 101, and the electrical connections to the strips may be brought together at a terminal box that includes the electronics for control and processing, such as those elements shown in FIG. 6. In particular, side view 1502 shows one example electrical coupling arrangement, where one common lead 1560 (e.g., a ground lead) connects all elements to each other, and a set of individual leads (e.g., 1562, 1564, 1566, which may be signal send or signal receive leads) connects each element to electronics within assembly housing 611, for example.

In FIG. 16, perimeter ranging system 148*a* includes two or more ultrasonic transducer elements 1648*a,b,c* with at least one element displaced vertically from at least one other element, so as to provide for vertical discrimination, as described herein. Also shown as part of perimeter ranging system 148*a* are two imaging modules 1680 and 1682, where all transducer elements and imaging modules are integrated into a single assembly 1610 so as to form a single point installation with 3D ranging and sensor fusion capabilities. In some embodiments, imaging modules 1680 and 1682 may be implemented as a stereo imaging pair of imaging modules and configured to provide stereo image data, which may be used to generate 3D representations of a scene imaged by imaging modules 1680 and 1682. In other embodiments, imaging modules 1680 and 1682 may be implemented as a visible spectrum imaging module and an infrared imaging module with overlapping fields of view. In either embodiment, image data may be combined with perimeter sensor data derived from returns sensed by ultrasonic transducer elements 1648*a,b* and/or *c*, so as to facilitate generating any of the display views described herein, for example, or to facilitate generation of a 3D representation of an area about watercraft 101, as described herein.

Figure 17:
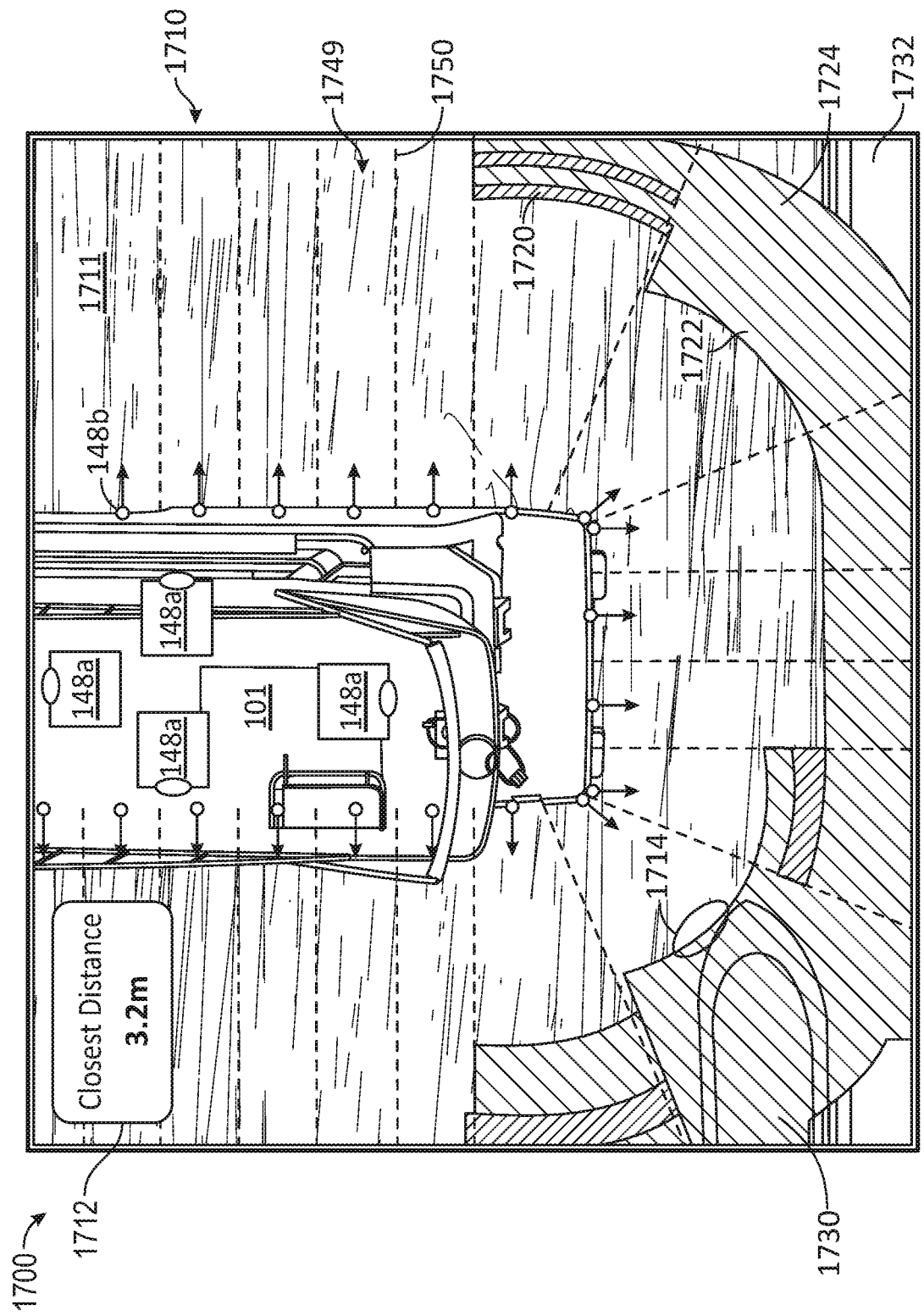
FIG. 17 shows a display view for a docking assist system in accordance with an embodiment of the disclosure.

For example, FIG. 17 shows a display view 1700 for docking assist system 100 in accordance with an embodiment of the disclosure. In general, display view 1700 and/or system 100 may be configured to provide information about the proximity of surrounding objects and structures. Perimeter sensor data aggregated by system 100 may then be used to support autonomous or semi-autonomous control of watercraft 100 for navigation, maneuvering, and docking, as described herein. Such data can be used by itself, isolated from other sensors, or can combined with various other types of sensor data, as described herein. Display view 1700 shows an example of a display view that uses perimeter sensor data for assisted docking.

For example, various display elements may be rendered as an overlay over a camera or chart view and be configured to show the range data, where strong returns may be shown in one critical color (e.g., red) and less strong returns may be shown in a less critical color (e.g., blue). The transparency of such overlay can be based on and/or controlled by the intensity of the returns, where stronger returns are more opaque/less transparent. The color of the overlay may also be controlled such that objects or structures that are within a set danger zone are made more conspicuous, such as by highlighting. A numerical indicator may be rendered within the display view to provide a more accurate spatial indication to an operator/pilot. In some embodiments, a similar display view may be generated with the positions and/or orientations of sensor elements shown along with corresponding transition lines, which may represent the borders of the limit of validity for each of the sensor elements. In some embodiments, the effective azimuth resolution can be improved by limiting perimeter sensor data from a particular sensor element to returns arriving from within the corresponding valid detection area. Individual sensor beam coverage would be wider than such valid detection areas, so an alternative would be to show overlapping data that is limited by the arc of coverage of the individual sensors.

As shown in FIG. 17, display view 1700 may be implemented as a maneuvering guide similar to maneuvering guide 1210 of FIG. 12 and include many of the same display elements. In the embodiment shown in FIG. 17, maneuvering guide 1700 may include a base image or chart 1710 including and/or indicating water surface 1711 and watercraft 101 along with various nearby imaged or charted navigation hazards or structures, such as moored boat 1730 and pier 1732, as shown. System 100 may be configured to receive perimeter sensor data from perimeter sensor systems 148*a* and/or 148*b* and generate both base image or chart 1710 and a selection of display elements configured to help a user of system 100 intuitively recognize a safety and/or operational status of mobile structure 101, similar to the display elements identified with respect to display views 1200-1300 of FIGS. 12-13.

For example, display view 1700 may correspond to a docking assist navigation mode for system 100. As shown in FIG. 17, display view/maneuvering guide 1700 includes sensor assembly position and orientation indicators 148*a* and 148*b*, corresponding sensor transition lines 1750 identifying valid detection areas 1749 associated with corresponding sensor assemblies 148*b*, a closest distance reporter 1712 (e.g., a textual and/or graphical reporter) configured to report a closest approach distance between a perimeter of watercraft 101 and all detected navigation hazards, a corresponding closest approach highlighter 1714 (e.g., a graphical indicator) configured to indicate a relative position of a navigation hazard or portion of a navigation hazard corresponding to the closest approach distance reported by closest distance reporter 1712, and various elements of an obstruction map overlay (e.g., display elements 1720-1724) configured to indicate the relative position and/or strength of corresponding perimeter sensor signal returns (e.g., ultrasonic returns).

In some embodiments, maneuvering guide 1700 may form part of a larger display view and be disposed between various individual video feeds, arranged according to a geospatial video feed arrangement, for example, each feed of which may be provided by an embodiment of perimeter sensor system 148*a* of FIG. 16. In alternative embodiments, maneuvering guide 1700 may be disposed between various three-dimensional renderings of a monitoring area associated with a correspondingly placed perimeter ranging sensor assembly, such as any of perimeter ranging systems 148*a*, as shown. In various embodiments, a docking user interface may include various other indicators and/or buttons, selectors, or other controls, as described herein, including any of the display elements identified in display views 1200 and 1300 of FIGS. 12-13.

In various embodiments, system 100 may be configured to render any one of display elements 1720-1724 as overlays over base image/chart 1710, each of which may be configured to indicate relative positions of navigation hazards disposed within a monitoring perimeter of perimeter ranging systems 148*a,b* of mobile structure 101, such as in an obstruction map or overlay. In some embodiments, each display element 1720-1724 of such obstruction map may be implemented by a graphics texture with a shape generally matching that of the intruding navigation hazard or a sense range of the corresponding sense element, for example, and may include a color, saturation, translucency, and/or pattern configured to convey a strength of the signal return corresponding to the detected navigation hazard. In some embodiments, display elements 1720-1724 may be animated and/or flashing to draw attention of a user. In further embodiments, such navigation hazard may be identified and visually highlighted in a corresponding video feed, such as by an overlay similar in color, pattern, shape, and/or translucency to a corresponding display element 1720-1724.

In various embodiments, system 100 may be configured to determine orientations and/or positions (e.g., relative to each other and/or a perimeter of mobile structure 101) of each of perimeter sensor systems 148 and/or 148b and/or their individual sensor elements. For example, user interface 120 may be configured to receive user input manipulating an orientation selector to select or adjust a relative orientation of a sensor assembly orientation indicator corresponding to one perimeter ranging system 148a. In another embodiment, such user input may select a particular element of ultrasonic perimeter ranging sensor system 148b to indicate that system 100 should attempt to determine its relative orientation and position (e.g., relative to a perimeter of mobile structure 101) based, at least in part, on perimeter sensor data.

In additional embodiments, a speed of watercraft 101 or a speed of surrounding objects can be determined through identification of objects within the perimeter sensor data, determining whether the objects are mobile or not, and extracting either a speed of watercraft 101 or a navigation hazard's speed based, at least in part, on the change of distance with time as represented in the perimeter sensor data. In related embodiments, Doppler information may be extracted from the perimeter sensor data and used to determine relative radial speeds. Knowledge of the relative speed of objects and structures provides the ability to differentiate between and separate out individual objects and structures, thereby improving an understanding of the surrounding environment.

For accurate operation of a perimeter ranging system, the relative positions and/or orientations of the individual sensor elements should be known or determined. Embodiments are able to self-determine such positions and/or orientations through auto-calibration methods, as described herein, when such information isn't measured or known through general installation. One method of auto-calibration includes: transmitting via a first sensor and detecting the direct transmission via surrounding sensors (e.g., not via reflection off of a navigation hazard). The time of flight of the transmission may be used to calculate the distance between the array of sensors, and these distances may be stored as calibration data and used as the auto-calibration proceeds. System 100 may be configured to set watercraft 101 at a known attitude to a relatively flat structure, such as a wall, and then to energize the perimeter ranging system to detect the structure. The differences between the known relative attitude and the measured relative attitude may be determined and stored as further calibration data and used as the auto-calibration proceeds. Each measurement may be performed multiple times in an iterative process to refine the calibration, which results in a determination of the relative positions and orientations of each sensor element in the perimeter ranging system.

In further embodiments, portions of perimeter sensor system 148 may be placed on hull 105b and/or transom 107b so as to be at least partially below the corresponding waterline. Typically, such systems are limited to in-air operation, mainly because the navigation hazards desired to be detected are above water. However, an at least partially submerged installation offers a number of advantages, including a larger effective range. Such embodiments would include sensor elements distributed about watercraft 101 and aimed out away from hull 105b and would be used to detect the proximity of objects and structures, relative to a perimeter of watercraft 101.

In addition to navigation assistance, embodiments of system 100 may be used provide other safety benefits, such as premises security and intruder detection. For example, system 100 may be used to detect movement that is in the proximity of watercraft 101, such as while watercraft 101 is otherwise stationary, and so system 100 may be configured to detect such movement and set off an audible or visible alarm (e.g., via a siren or strobe light and/or other elements of other modules 180) and/or communicate the alarm wirelessly to a portable user device in possession of the operator/pilot. In such embodiments, a full 360-degree azimuth coverage may be provided for a fully populated perimeter monitoring array.

In yet further embodiments, system 100 may be configured to provide directional monitoring device, where multiple sensor elements may be arranged as a relatively long base line listening device so that direction of, for example, an oncoming vehicle could be detected, its bearing resolved, and a warning provided to the operator.

Embodiments may include multi-located ranging sensors configured to generate perimeter ranging sensor data, as described herein. Such sensors may be implemented for acoustic ranging and may be fitted for in-air and/or underwater ranging. Such sensors may be implemented as individual elements or grouped elements for short baseline or phased array processing, as described herein. The sensors may be embedded within a strip that can be affixed to a vessel or may be embedded or fitted within the vessel itself. In some embodiments, additional sensor elements and/or perimeter ranging sensor assemblies may be fitted to objects and structures where the sensor elements/assemblies are configured to auto respond to sensor elements coupled to the vessel. In general, sensor assemblies may be configured to communicate wirelessly or via wired electrical connections. Sensor assemblies may be configured to operate as monostatic sensor arrays, bi-static sensor arrays, and/or multistatic sensor arrays, for example, the operation of which may be orchestrated to avoid interference between sensor elements, as described herein.

Perimeter sensor data may be displayed to identify and characterize detected navigation hazards, for example, and to differentiate water surfaces from structures. For example, perimeter sensor data may be displayed as an overlay on an image indicating the vessel position relative to the surrounding objects and structures, where the color(s) of the overlay display elements indicates the strength of corresponding returns, or where the overlay is semi-transparent and the level of transparency is a function of the strength of the returns. Objects or structures identified in such overlay may be highlighted when they fall within a specified approach distance about the vessel, and a corresponding display view may include a numerical indication of the closest object or structure. Perimeter sensor data may also be used for autonomous and/or assisting navigation or maneuvering, including determining an own vessel speed and speeds of other vessels, and using such speeds to differentiate between moving and non-moving objects. A perimeter ranging system may also be configured to detect and report intruders to the vessel, for example, or to provide directional listening, as described herein. More generally, perimeter ranging systems may include both perimeter ranging sensors and other sensors, as described herein, and the sensor data provided by all sensors may be combined to provide further assistance to an operator or pilot. Perimeter ranging systems may be configured to auto-calibrate the relative position and/or orientation of individual sensor elements.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
    a perimeter ranging system comprising one or more ultrasonic perimeter ranging sensor assemblies configured to be coupled to a mobile structure, each sensor assembly comprising one or more ultrasonic transducers each of which is operable to generate a beam; and
    a logic device configured to communicate with the perimeter ranging system, wherein the logic device is configured to:
        receive perimeter sensor data from each of the one or more ultrasonic perimeter ranging sensor assemblies of the perimeter ranging system;
        determine a horizontal distance from the mobile structure to a navigation hazard based at least in part on the perimeter sensor data received over time from at least one of the one or more ultrasonic perimeter ranging sensor assemblies; and
        generate one or more navigation control signals based, at least in part, on the determined horizontal distance, the one or more navigation control signals being configured for a navigation control system for the mobile structure, the navigation control system comprising one or more of a steering actuator, a propulsion system, and/or a thrust maneuver system, the navigation control signals being configured to control one or more of the steering actuator, the propulsion system, and/or the thrust maneuver system,
    wherein the determining of the horizontal distance comprises at least one of:
        (1) determining a transition time of the navigation hazard appearing in beams of two of the sensor assemblies to appearing in the beam of only one of the two sensor assemblies,
        (2) determining an absolute velocity of the mobile structure and a rate of change of a range from at least one of the one or more sensor assemblies to the navigation hazard, the range being measured by the at least one of the one or more sensor assemblies, the horizontal distance being determined based at least in part on a relationship between the absolute velocity and the measured range, or
        (3) tracking the navigation hazard through beams of different ones of the sensor assemblies positioned at different heights, as the mobile structure approaches the navigation hazard and the navigation hazard is first detected and ranged by at least one of the different sensor assemblies but not by at least another one of the different sensor assemblies, but is later detected and ranged by the another one of the different sensor assemblies.

2. The system of claim 1, wherein the one or more ultrasonic perimeter ranging sensor assemblies comprises a plurality of ultrasonic perimeter ranging sensor assemblies, and the logic device is configured to:
    determine relative orientations and/or positions of the ultrasonic perimeter ranging sensor assemblies based, at least in part, on the perimeter sensor data received from each of the ultrasonic perimeter ranging sensor assemblies; and
    generate an obstruction map based, at least in part, on the received perimeter sensor data and the determined relative orientations and/or positions of the ultrasonic perimeter ranging sensor assemblies.

3. The system of claim 2, wherein the determining f the relative orientations and/or positions of the ultrasonic perimeter ranging sensor assemblies comprises:
    identifying common structures represented in the perimeter sensor data provided by adjacent ones of the ultrasonic perimeter ranging sensor assemblies; and
    determining a relative orientation and/or position of the adjacent ones of the ultrasonic perimeter ranging sensor assemblies based, at least in part, on the identified common structures represented in the perimeter sensor data.

4. The system of claim 2, wherein the determining f the relative orientations and/or positions of the one or more ultrasonic perimeter ranging sensor assemblies comprises:
    identifying a portion of the mobile structure represented in the perimeter sensor data provided by one ultrasonic perimeter ranging sensor assembly; and
    determining a relative orientation and/or position of the one ultrasonic perimeter ranging sensor assembly based, at least in part, on the identified portion of the mobile structure represented in the perimeter sensor data.

5. The system of claim 1, wherein the logic device is configured to:
    determine relative orientations and/or positions of the one or more ultrasonic perimeter ranging sensor assemblies based, at least in part, on user input selecting an estimated orientation and/or position for at least one of the one or more ultrasonic perimeter ranging sensor assemblies; and
    generate an obstruction map based, at least in part, on the received perimeter sensor data and the determined relative orientations and/or positions of the one or more ultrasonic perimeter ranging sensor assemblies.

6. The system of claim 1, wherein at least one of the one or more ultrasonic perimeter ranging sensor assemblies comprises:
 a plurality of ultrasonic transducers each aimed differently from the others; and
 wherein the determining of the horizontal distance comprises (1).

7. The system of claim 1, wherein:
 the mobile structure comprises a watercraft;
 at least one of the one or more ultrasonic perimeter ranging sensor assemblies is configured to be strapped or secured to a stanchion of the mobile structure; and
 the at least one of the one or more ultrasonic perimeter ranging sensor assemblies comprises a communications module configured to support wireless transmission of the perimeter sensor data to the logic device.

8. The system of claim 1, wherein:
 the mobile structure comprises a watercraft; and
 at least one of the one or more ultrasonic perimeter ranging sensor assemblies is integrated with a bumper or fender configured to be strapped or secured to a toe rail, stanchion, and/or railing of the mobile structure.

9. The system of claim 1, wherein the mobile structure comprises a watercraft, and at least one of the one or more ultrasonic perimeter ranging sensor assemblies comprises:
 a strip of ultrasonic transducer elements electrically coupled together and distributed along a length of the strip and configured to be attached to a hull of the mobile structure above an expected waterline level.

10. The system of claim 1, wherein the logic device is configured to:
 determine a relative velocity of the navigation hazard disposed within a monitoring perimeter of the perimeter ranging system based, at least in part, on the received perimeter sensor data.

11. The system of claim 10, wherein:
 the perimeter ranging system comprises one or more visible spectrum and/or thermal imaging modules mounted to the mobile structure and configured to capture images of corresponding one or more areas proximate to a perimeter of the mobile structure and including at least a portion of the perimeter of the mobile structure, and to provide the captured images as at least a portion of the perimeter sensor data to the logic device;
 wherein the determining of the horizontal distance comprises at least one of (1) or (3).

12. The system of claim 10, wherein:
 the logic device is configured to:
  determine one or more navigation control signals based, at least in part, on the determined relative velocity of the navigation hazard; and
  provide the one or more navigation control signals to a navigation control system for the mobile structure;
 the navigation control system comprises one or more of a steering actuator, a propulsion system, and a thrust maneuver system; and
 the providing the one or more navigation control signals to the navigation control system comprises controlling the one or more of the steering actuator, the propulsion system, and the thrust maneuver system to maneuver the mobile structure according to a target linear and/or angular velocity or a target docking position and/or orientation.

13. A method comprising:
 receiving perimeter sensor data from each of one or more ultrasonic perimeter ranging sensor assemblies of a perimeter ranging system coupled to a mobile structure, each sensor assembly comprising one or more ultrasonic transducers each of which generates a beam;
 determining a horizontal distance from the mobile structure to a navigation hazard based at least in part on the perimeter sensor data received over time from at least one of the one or more ultrasonic perimeter ranging sensor assemblies; and
 generating one or more navigation control signals based, at least in part, on the determined horizontal distance, the one or more navigation control signals being configured or a navigation control system for the mobile structure, the navigation control system comprising one or more of a steering actuator, a propulsion system, and/or a thrust maneuver system, the navigation control signals being configured to control one or more of the steering actuator, the propulsion system, and/or the thrust maneuver system,
 wherein the determining of the horizontal distance comprises at least one of:
  (1) determining a transition time of the navigation hazard appearing in beams of two of the sensor assemblies to appearing in the beam of only one of the two sensor assemblies,
  (2) determining an absolute velocity of the mobile structure and a rate of change of a range from at least one of the one or more sensor assemblies to the navigation hazard, the range being measured by the at least one of the one or more sensor assemblies, the horizontal distance being determined based at least in part on a relationship between the absolute velocity and the measured range, or
  (3) tracking the navigation hazard through beams of different ones of the sensor assemblies positioned at different heights, as the mobile structure approaches the navigation hazard and the navigation hazard is first detected and ranged by at least one of the different sensor assemblies but not by at least another one of the different sensor assemblies, but is later detected and ranged by the another one of the different sensor assemblies.

14. The method of claim 13, wherein the one or more ultrasonic perimeter ranging sensor assemblies comprises a plurality of ultrasonic perimeter ranging sensor assemblies, and the method further comprises:
 determining relative orientations and/or positions of the ultrasonic perimeter ranging sensor assemblies based, at least in part, on the perimeter sensor data received from each of the ultrasonic perimeter ranging sensor assemblies; and
 generating an obstruction map based, at least in part, on the received perimeter sensor data and the determined relative orientations and/or positions of the ultrasonic perimeter ranging sensor assemblies.

15. The method of claim 14, wherein the determining of the relative orientations and/or positions of the ultrasonic perimeter ranging sensor assemblies comprises:
 identifying common structures represented in the perimeter sensor data provided by adjacent ones of the ultrasonic perimeter ranging sensor assemblies; and
 determining a relative orientation and/or position of the adjacent ones of the ultrasonic perimeter ranging sensor assemblies based, at least in part, on the identified common structures represented in the perimeter sensor data.

16. The method of claim 14, wherein the determining of the relative orientations and/or positions of the one or more ultrasonic perimeter ranging sensor assemblies comprises:

identifying a portion of the mobile structure represented in the perimeter sensor data provided by one ultrasonic perimeter ranging sensor assembly; and determining a relative orientation and/or position of the one ultrasonic perimeter ranging sensor assembly based, at least in part, on the identified portion of the mobile structure represented in the perimeter sensor data.

17. The method of claim 13, further comprising:

determining relative orientations and/or positions of the one or more ultrasonic perimeter ranging sensor assemblies based, at least in part, on user input selecting an estimated orientation and/or position for at least one of the one or more ultrasonic perimeter ranging sensor assemblies; and generating an obstruction map based, at least in part, on the received perimeter sensor data and the determined relative orientations and/or positions of the one or more ultrasonic perimeter ranging sensor assemblies.

18. The method of claim 13, wherein the mobile structure comprises a watercraft, and at least one of the one or more ultrasonic perimeter ranging sensor assemblies comprises:

a plurality of ultrasonic transducers each aimed differently from the other; or a strip of ultrasonic transducer elements electrically coupled together and distributed along a length of the strip and configured to be attached to a hull of the mobile structure above an expected waterline level.

19. The method of claim 13, wherein:

the mobile structure comprises a watercraft;

at least one of the one or more ultrasonic perimeter ranging sensor assemblies is configured to be strapped or secured to a stanchion of the mobile structure and/or integrated with a bumper or fender configured to be strapped or secured to a toe rail, stanchion, and/or railing of the mobile structure; and the at least one of the one or more ultrasonic perimeter ranging sensor assemblies comprises a communications module configured to support wireless transmission of the perimeter sensor data to the logic device.

20. The method of claim 13, further comprising:

determining a relative velocity of the navigation hazard disposed within a monitoring perimeter of the perimeter ranging system based, at least in part, on the received perimeter sensor data;

wherein the determining of the horizontal distance comprises at least one of (1) or (3).

* * * * *

UNITED STATES PATENT AND TRADEMARK OFFICE
CERTIFICATE OF CORRECTION

| | |
|---|---|
| PATENT NO. | : 11,733,699 B2 |
| APPLICATION NO. | : 17/012035 |
| DATED | : August 22, 2023 |
| INVENTOR(S) | : Mark Johnson et al. |

It is certified that error appears in the above-identified patent and that said Letters Patent is hereby corrected as shown below:

In the Specification

In Column 1, Lines 11-12, change "patent application Ser. No." to --Patent Application No.--.

In Column 1, Lines 15-16, change "Patent application Ser. No." to --Patent Application No.--.

In Column 33, Line 58, change "perimeter intrusion indicator." to --perimeter intrusion indicator 1214.--.

In the Claims

Claim 3, Column 42, Line 33, change "wherein the determining f the" to --wherein the determining of the--.

Claim 4, Column 42, Line 45, change "wherein the determining f the" to --wherein the determining of the--.

Claim 13, Column 44, Lines 11-12, change "signals being configured or a navigation control system" to --signals being configured for a navigation control control system--.

Signed and Sealed this
Twenty-first Day of May, 2024

Katherine Kelly Vidal
*Director of the United States Patent and Trademark Office*